(12) United States Patent
Chelminski

(10) Patent No.: US 8,570,835 B2
(45) Date of Patent: Oct. 29, 2013

(54) MARINE VIBRATORY SOUND SOURCE FOR BENEATH WATER SEISMIC EXPLORATION

(76) Inventor: Stephen Chelminski, Antrim, NH (US)

(*) Notice: Subject to any disclaimer, the term of this patent is extended or adjusted under 35 U.S.C. 154(b) by 0 days.

(21) Appl. No.: 13/593,787

(22) Filed: Aug. 24, 2012

(65) Prior Publication Data

US 2013/0051180 A1 Feb. 28, 2013

Related U.S. Application Data

(60) Provisional application No. 61/575,605, filed on Aug. 24, 2011, provisional application No. 61/686,199, filed on Mar. 30, 2012.

(51) Int. Cl.
*G10K 11/00* (2006.01)
*G01V 1/38* (2006.01)

(52) U.S. Cl.
USPC ............ 367/172; 181/114; 181/120; 367/143

(58) Field of Classification Search
USPC ............................ 367/172, 143; 181/114, 120
See application file for complete search history.

(56) References Cited

U.S. PATENT DOCUMENTS

| | | | | |
|---|---|---|---|---|
| 4,180,139 A * | 12/1979 | Walker | ............................ | 181/120 |
| 4,466,083 A * | 8/1984 | Willard et al. | ................ | 367/175 |
| 4,763,307 A * | 8/1988 | Massa | ............................ | 367/174 |
| 4,868,799 A * | 9/1989 | Massa | ............................ | 367/172 |
| 4,885,726 A * | 12/1989 | Myers | ............................ | 367/142 |
| 5,062,089 A * | 10/1991 | Willard et al. | ................ | 367/172 |
| 5,144,596 A * | 9/1992 | Pascouet | ........................ | 367/144 |
| 5,206,839 A * | 4/1993 | Murray | .......................... | 367/175 |
| 5,263,007 A * | 11/1993 | Jenkins | .......................... | 367/144 |
| 6,046,962 A * | 4/2000 | Suppa et al. | ................... | 367/172 |
| 6,252,822 B1 * | 6/2001 | Obara | ............................... | 367/1 |
| 6,464,035 B1 * | 10/2002 | Chelminski | .................... | 181/120 |
| 6,483,778 B1 * | 11/2002 | Pozzo et al. | ................... | 367/172 |
| 2011/0242935 A1 * | 10/2011 | Amundsen et al. | .............. | 367/21 |
| 2012/0095629 A1 * | 4/2012 | Fjellstad et al. | ................. | 701/21 |

* cited by examiner

*Primary Examiner* — Ian J Lobo
(74) *Attorney, Agent, or Firm* — ZIP Law PLLC; Claire Zopf

(57) ABSTRACT

A marine vibratory sound source for producing swept or pulse coded signals in a body of water and within geological structures beneath a body of water, primarily for seismic exploration of the strata beneath the bottom of the water. More particularly, a high power, servo controlled hydraulic, sound source that can readily be towed in water, towed along the bottom surface under the water or be used in a stationary position on the bottom surface under the water.

22 Claims, 20 Drawing Sheets

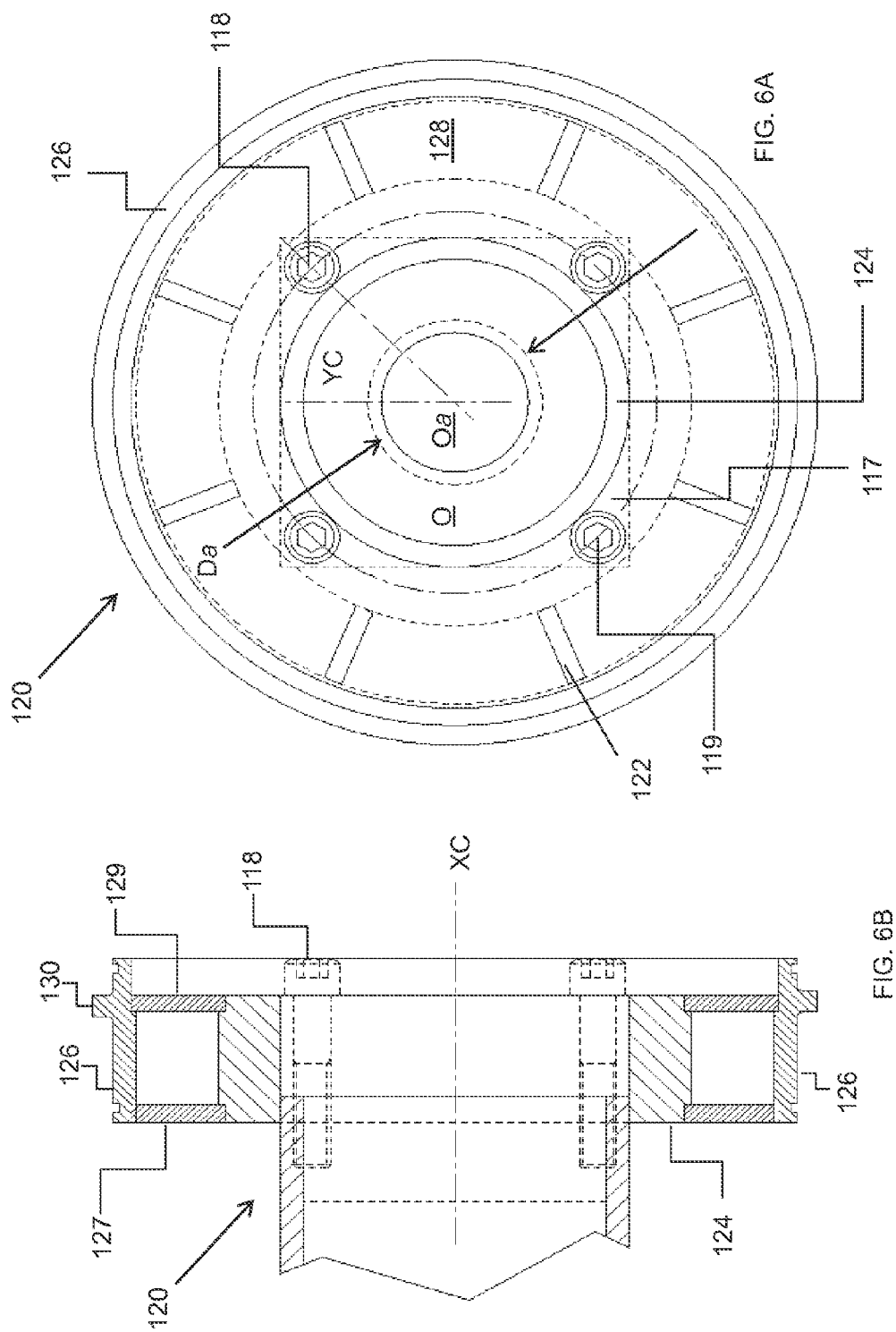

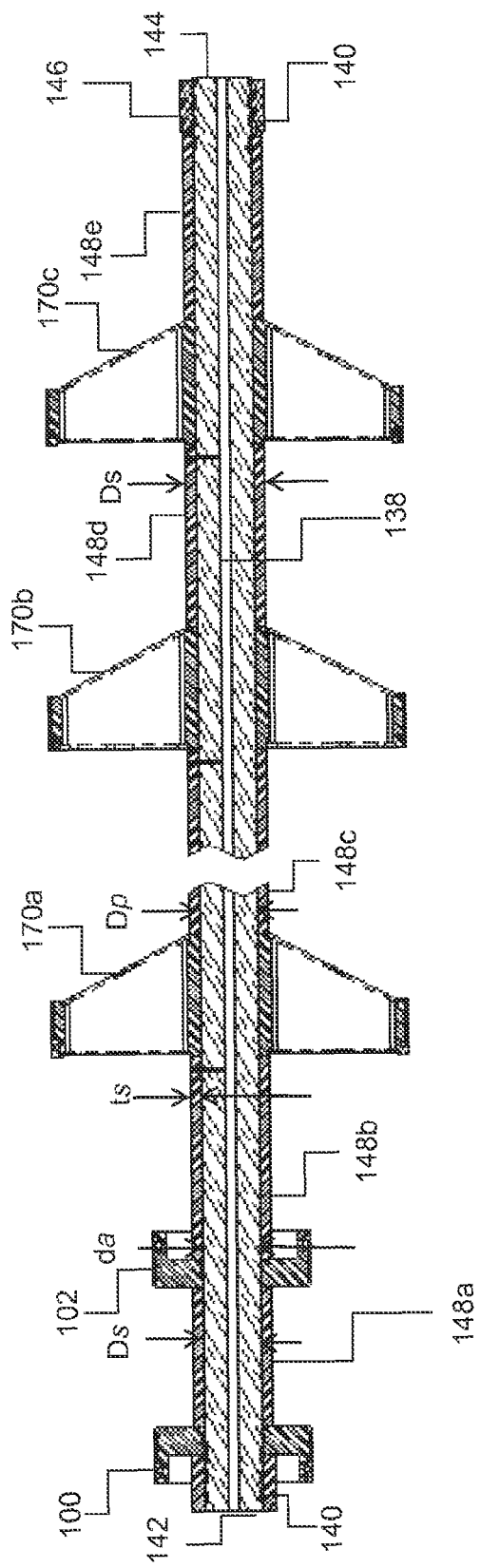

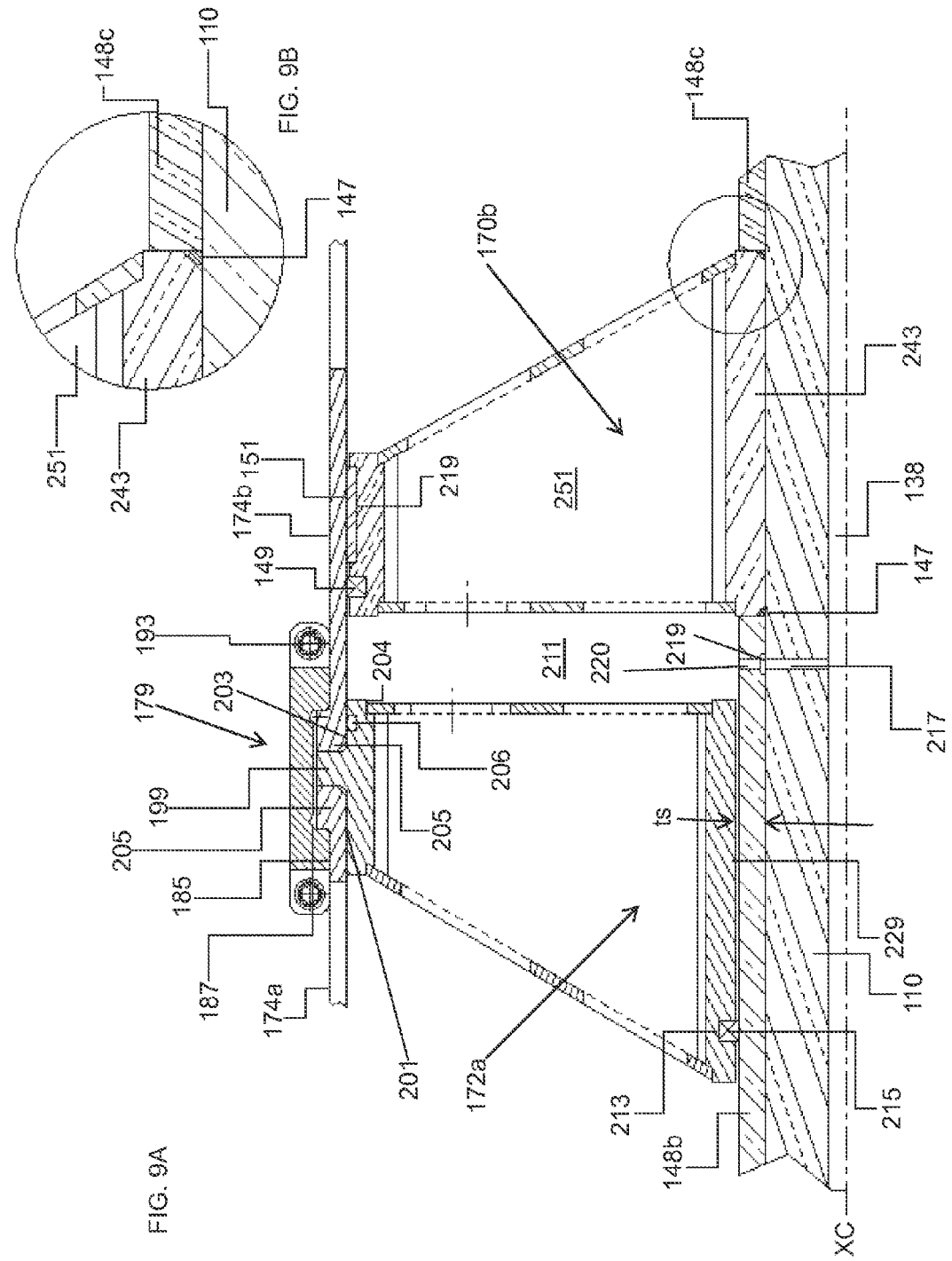

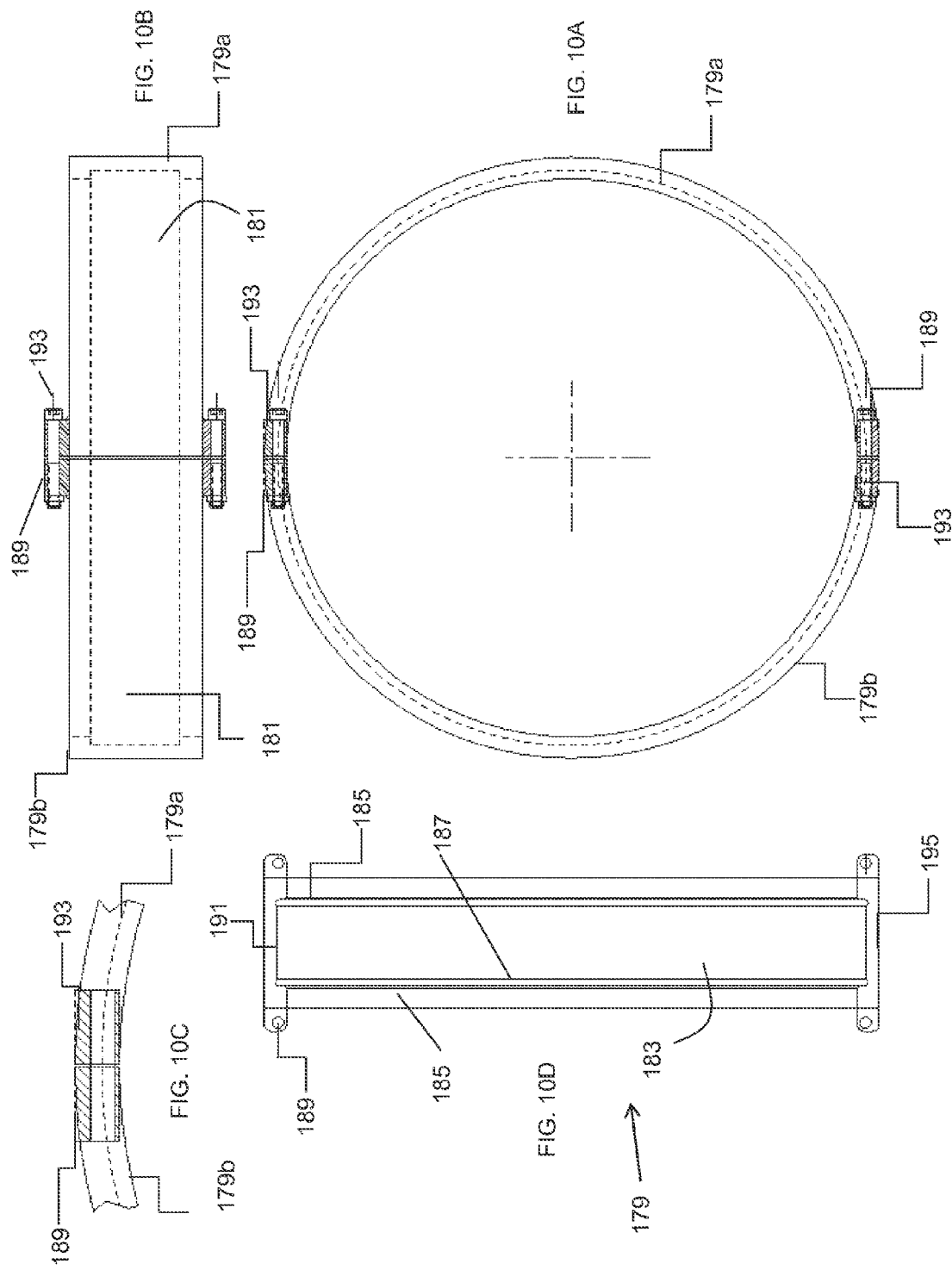

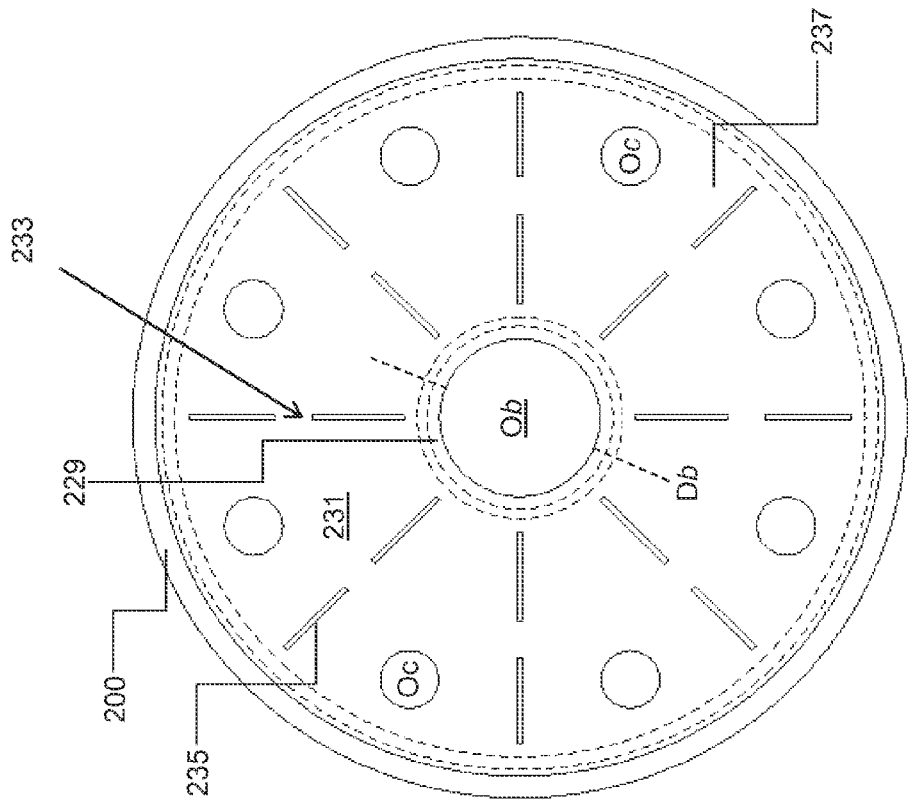
FIG. 11A
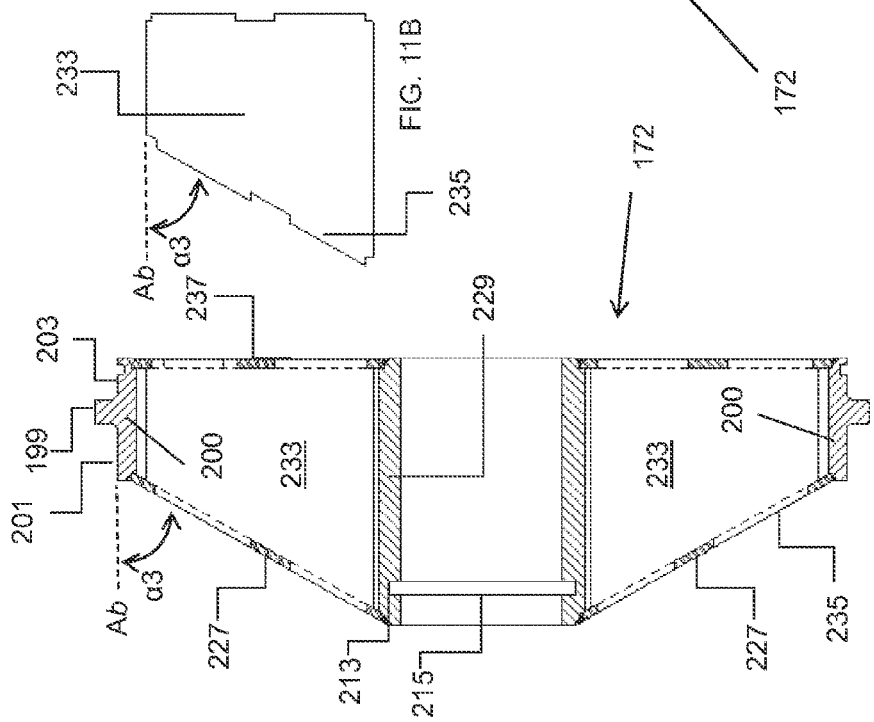
FIG. 11B
FIG. 11C

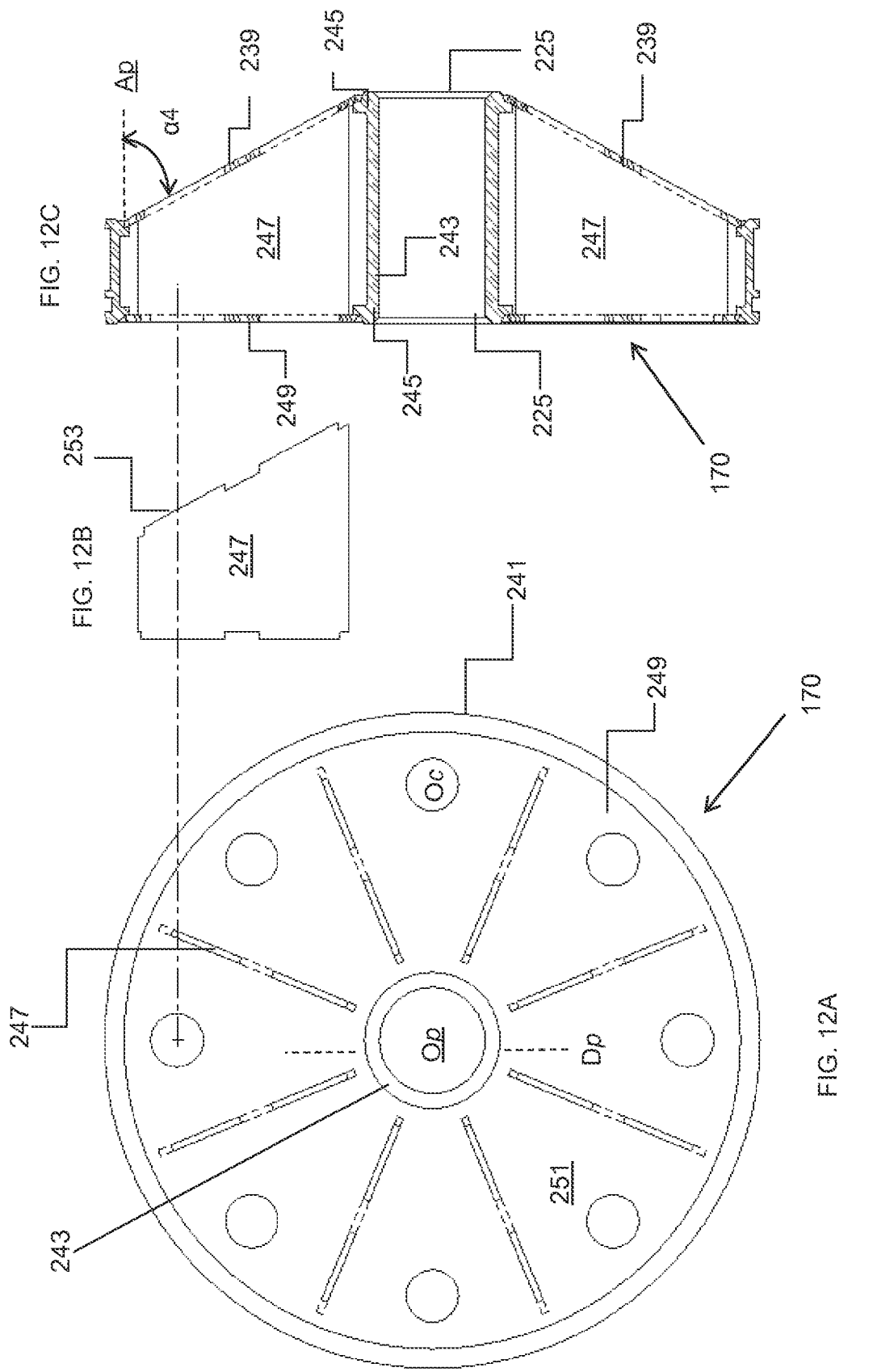

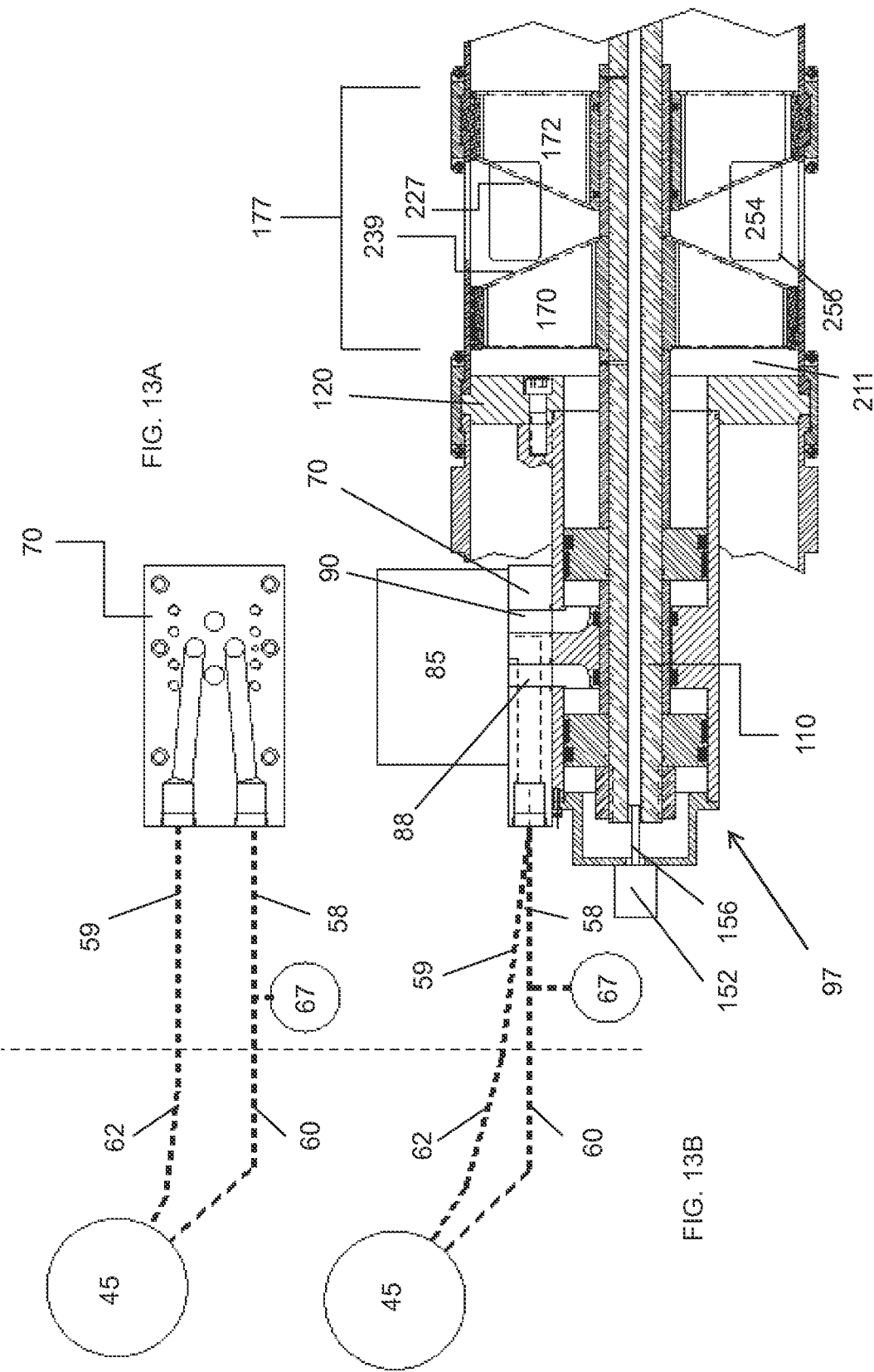

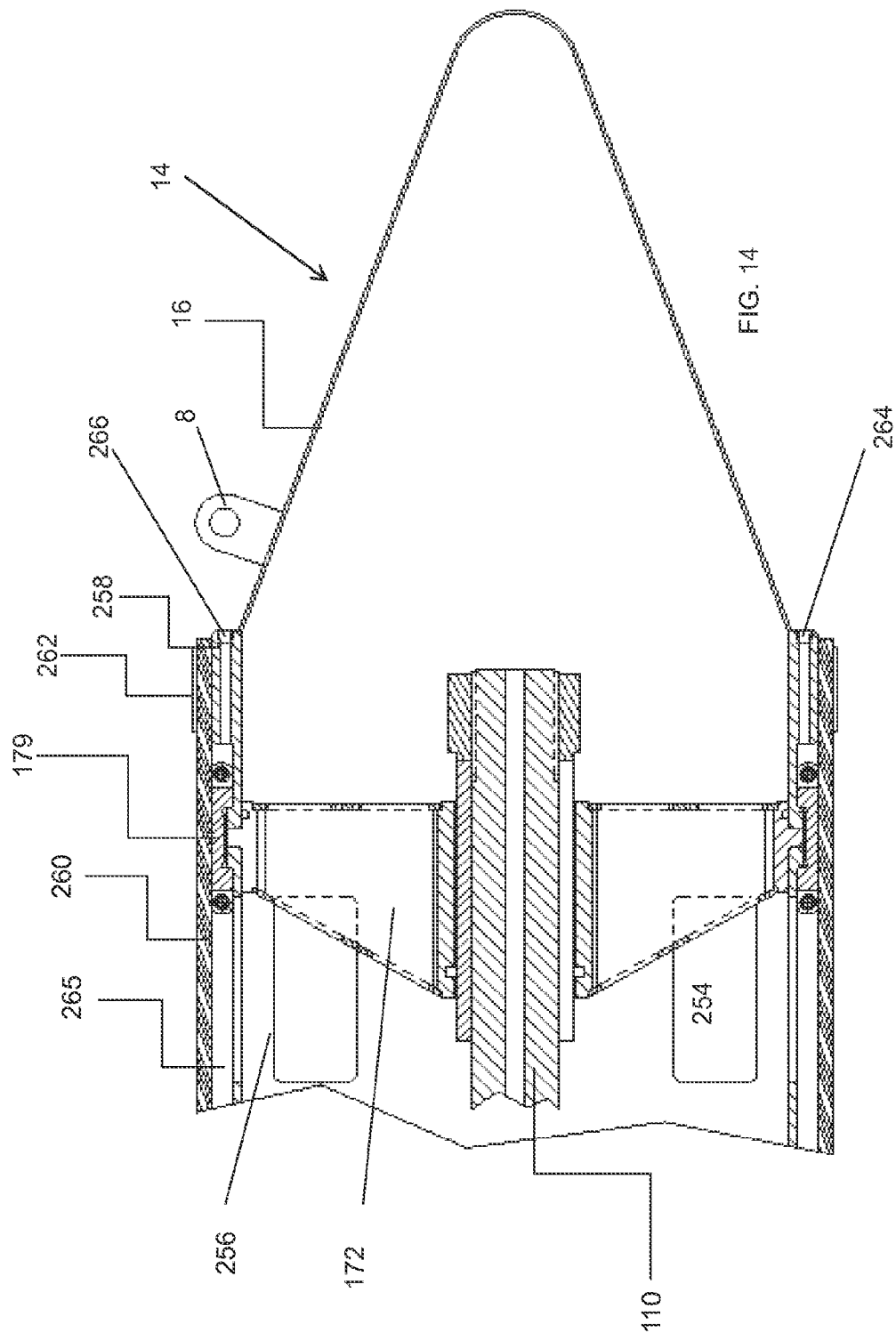

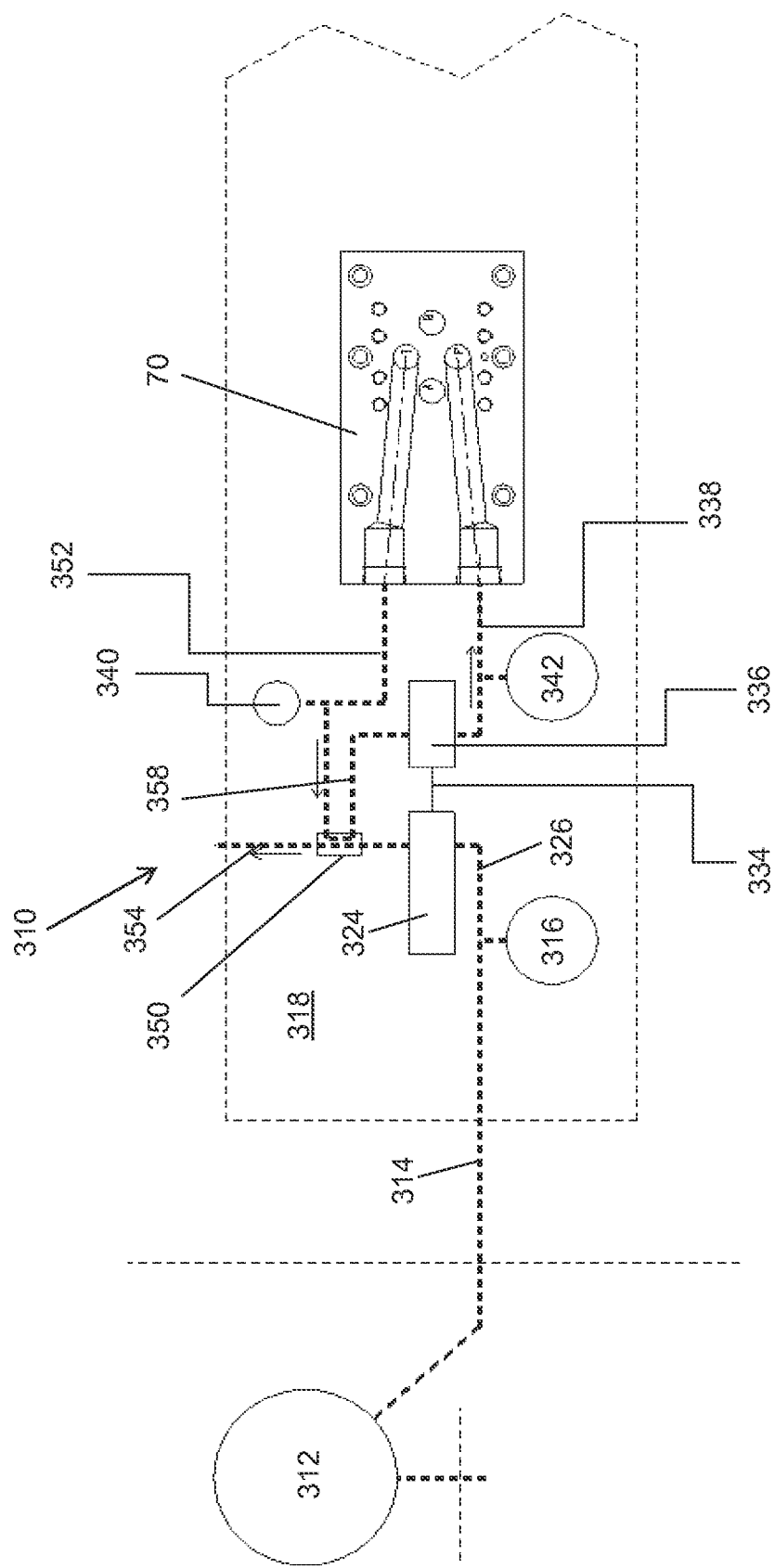

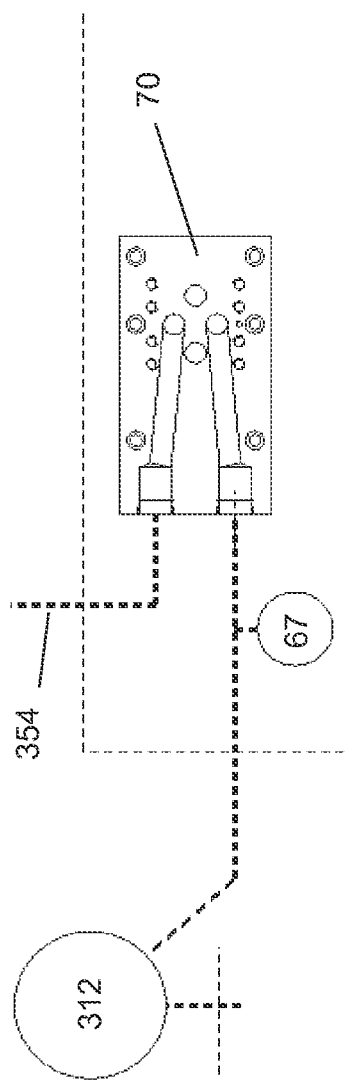
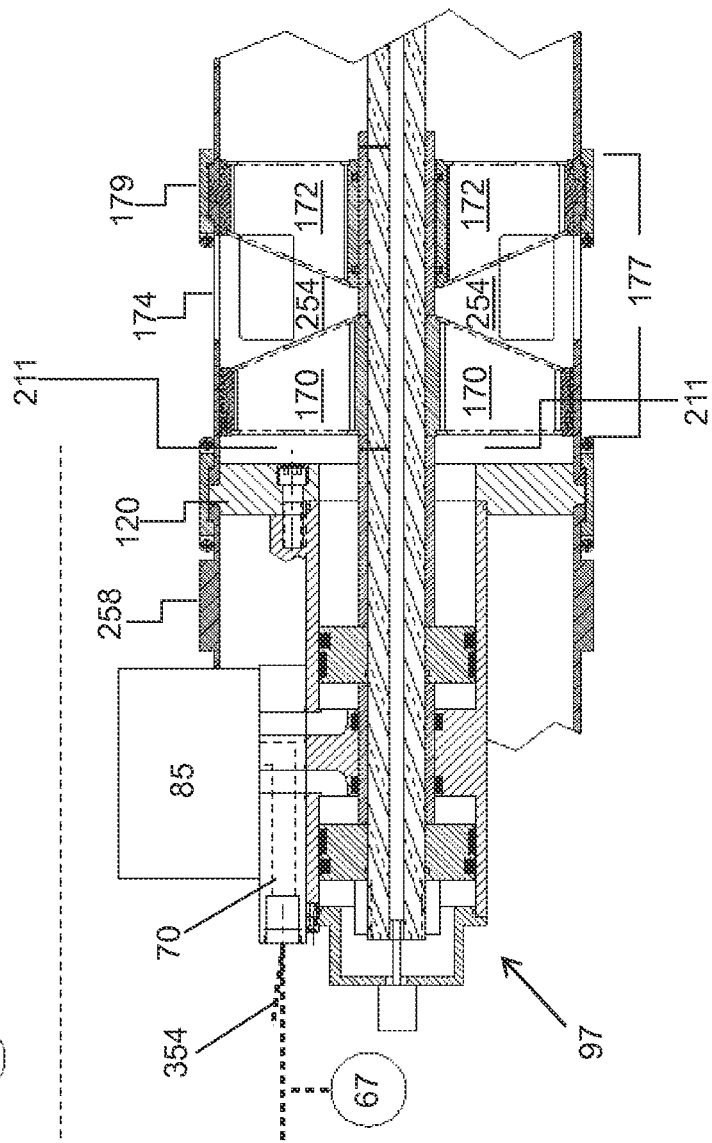

MARINE VIBRATORY SOUND SOURCE FOR BENEATH WATER SEISMIC EXPLORATION

CROSS REFERENCE TO RELATED APPLICATIONS

This application claims the benefit of U.S. Provisional Application No. 61/576,605 filed Aug. 24, 2011 and U.S. Provisional Application No. 61/686,199 filed Mar. 30, 2012 each application entitled Improved Marine Vibratory Sound Source for Beneath Water Seismic Exploration which are hereby incorporated in by reference in their entireties.

FIELD OF THE INVENTION

The present invention relates to a marine vibratory sound source for producing swept or pulse coded signals in a body of water and within geological structures beneath a body of water, primarily for seismic exploration of the strata beneath the bottom of the water. More particularly, this invention relates to a high power, servo controlled hydraulic, sound source that can readily be towed in the water, towed along the bottom surface under the water or be used in a stationary position on the bottom surface under the water. The illustrative embodiment of the invention is a marine vibratory sound source having a sleek, tube-like configuration with an optional control fin to assist in maintaining the device at a specified depth within a body of water.

BACKGROUND

There are prior vibratory-type marine sound sources, but such equipment has been heavy, bulky, clumsy and awkward to deploy behind a seagoing vessel. Certain prior hydraulically-actuated vibratory marine sound sources were attempted to be mounted directly on the stern of a seagoing vessel. However, action/reaction forces generated by such stern-mounted, hydraulically-driven, vibratory, sound equipment produced troublesome, disturbing and undesirable vibrations involving stern portions of the vessel itself. Such vibrations became severe in structural members, panels, braces and the like which happened to be vibrationally resonant with fundamental and/or harmonic (overtone) frequencies generated by a large, stern-mounted, powerful, hydraulically-driven vibratory sound source.

Attempts to use prior vibratory sound sources separated from the vessel itself and being towed through a body of water behind the vessel have experienced considerable difficulties. Their heavy weight and bulk have made them difficult to lift from shipboard over the stern and then lower into the water for deploying them. They similarly were difficult to retrieve from the water to return them onto shipboard.

Furthermore, large cross-sectional areas of prior marine seismic vibratory apparatus, i.e., their frontal areas, produced unacceptably large drag forces through water, thereby tugging backward against forward motion of towing vessels. Undesirable consequences of large drag forces are unduly large stresses in towing gear and wasteful large consumptions of fuel used in propelling towing vessels.

A sleek, fish-like configuration that produced minimum drag was described by the present inventor in U.S. Pat. No. 6,464,035 which is herein incorporated by reference. The disclosed device corrected many of the issues noted above however the device had minimal control in positioning the system at a specified depth and a flaw in pressure balancing. Accordingly, there is a need for a marine sound source system that improves depth positioning control, improves frequency response, improves energy efficiency and reliability through the reduction of unwanted accelerations, and provides a reduction in the risk of contamination of the surveyed body of water.

SUMMARY OF INVENTION

In accordance with one aspect of the present invention a towable marine vibratory energy source for generating and propagating intense, swept-frequency and pulse-coded sound energy signals into a body of water for exploration of the geologic structures beneath the bottom of the water is disclosed.

Among numerous advantages provided by the illustrative embodiment of the invention are those resulting from its streamlined shape and controls for towing or positioning and maintaining the device at a specified depth within a body of water. The sleek contours of the marine vibratory source allow for the system to maneuver over the terrain of the geological structures on the bottom surface without causing excessive drag or catching or hooking the system on protruding rock formations or other objects on the floor of the ocean, sea, lake or other body of water. The sleek shape without protrusions also aides in moving the system on and off of the survey vessel. Optionally, a depth control fin may be affixed to the system to assist in positioning the marine vibratory source at a desired depth while being towed from a survey vessel at low and high speeds. The system may further be operated in a stationary position on the bottom surface of the body of water.

In accordance with a unique aspect of the present invention the vibratory source has a hemispherical towing head and a streamlined tail head mounted onto a mid-section that is formed as a long, cylindrical stainless steel housing. Attached to the upper surface of the towing head is an auxiliary hatch with a series of attachment ports for connection of air, water, hydraulic and electrical control lines. The series of attachment ports extend at an acute angle pointed in a direction opposite to the direction the marine vibratory source is pulled. The opposing angle relieves stress within high pressure hydraulic lines, air lines and the bundle of electrical cables. Hydraulic input and output lines each attach to input and output conduits of a main fluid delivery assembly with each conduit extending through separate over-sized openings in the auxiliary hatch. The openings are of a larger diameter than the main piping conduits to allow for the main fluid delivery assembly to vibrate within the larger diameter openings as high pressure hydraulic fluid is fed in and out of the servo valve at frequencies ranging from 2 Hz to 200 Hz, for example, when the marine vibratory source is in operation. Stainless steel piping welded to the auxiliary hatch surrounds each input and output conduit with an elastic, flexible, rubber hose jumper attaching the hatch piping to the detachable fitting of input and output hydraulic lines. Within the towing head housing, the high pressure hydraulic fluid is further fed through a pulse dampener in line with the main fluid delivery assembly to remove pulsations caused by changes in the direction of flow of the high pressure hydraulic fluid. Low and high frequency pulsations are absorbed by the pulse dampener preventing damage to the servo valve or other system components and reducing spurious noise and vibration as fluid pressures within the lines reach for example 3000 psi.

Another important aspect of the marine vibratory source is a modular cylindrical housing forming the mid-section with the end to end attachment of a number of piston chamber assemblies. Each of the piston chamber assemblies are affixed in axial alignment to one another with a forward assembly attached to the shell of the towing head and the aft assembly attached to the shell of the tail head. The attachments are made using a three-part flange clamping ring to secure the cylindrical housing of a first piston chamber assembly to the outer diameter of a stationary bulkhead within the chamber. The cylindrical housing of a second piston chamber assembly is also secured to the stationary bulkhead within the clamping ring with each additional chamber similarly attached forming the mid-section. As many chambers as are necessary may be attached using this modular construction which allows for the system to be configured to a length and dimension suitable to accommodate the vibratory power output requirements for a particular body of water and survey.

Within each of these modular piston chambers is an axially vibratable piston affixed to an appropriate length piston shaft that is inserted through an opening in the stationary bulkhead of each piston chamber assembly. The piston shaft moves back and forth within the center hole of the stationary bulkheads. The pistons and stationary bulkheads each have a cone-shaped face positioned opposing one another to form an hour-glass shaped compression chamber. As the piston moves back and forth with the shaft, water is pulsed between and out of the cone-shaped faces of the piston and bulkhead propagating waves out and around the marine vibratory system. The cone-shaped face of the pistons and bulkheads directs the motion of water out and through ports within the cylindrical housing improving characteristics of the vibratory signal over flat faced pistons. The cone-shaped faces further reduce the compression chamber volume and thereby reduce the overall system power requirements as a smaller volume of water as compared to a comparably sized flat faced piston must be moved. Within the chamber, the shaft and pistons vibrate back and forth to produce sound waves that are used to identify geological structures beneath the bottom of the body of water.

The cone-shaped pistons are made of for example titanium and are hollow in construction with internal gussets and ribs supporting the construction making the overall weight of the system lighter and further reducing power requirements. The cone-shaped pistons are positioned along the titanium shaft using titanium sleeve spacers that with separate spacers extending through the opening in each of the cone-shaped stationary bulkheads position the pistons between each bulkhead. The stationary bulkheads are made of a non-corrosive material such as stainless steel or stainless steel alloys such as 17-4 ph. The bulkheads are also formed as hollow, thin circular rings with the cone-shaped face and a flat rear surface placed adjacent the flat rear surface of a cone-shaped piston within the next piston assembly chamber. Each rear surface of the piston and bulkhead has a series of holes forming an air cavity common with the interiors of the piston and stationary bulkhead. Air is fed from a compressor and through a pressure regulator on the survey vessel and forced into an axial passage in the center of the titanium piston shaft to enter air cavities and the interior volumes of the pistons and bulkheads. This pressure is maintained at or close to the ambient water pressure to balance the force on the pistons while in operation. This balancing air pressure also fills the interior compartments of the towing and aft heads. Using a dual pressure sensor affixed to the outer shell of the towing head, the interior and exterior pressures are measured and relayed to a control system on the survey vessel. Based on these pressure readings adjustments to the air pressure of the system may be made to change the characteristics of the vibratory signal. Monitoring system pressure may further detect air leaks or other system anomalies.

The piston shaft extends into an actuator cylinder housing within the towing head. A tandem actuator piston assembly within the housing is affixed to the piston shaft with movement of the actuator pistons controlled by a closed loop hydraulic power delivery circuit. A manifold is mounted directly on the flat top surface of the actuator cylinder housing with a servo valve mounted directly on top of the manifold forming vertical fluid delivery bores that extend directly through the manifold to the hydraulic chambers of each actuator piston. The delivery bores are of a minimal length that is less than the diameter of an actuator piston improving the efficiency of fluid delivery to the system. In operation a controller on the survey vessel sends modulated swept or pulsed electrical signals to the servo valve to direct high pressure hydraulic fluid to flow through the forward delivery bore to fill the forward actuator piston hydraulic chamber. Simultaneously, fluid flow is directed out of the aft actuator hydraulic chamber to evacuate fluid from the aft actuator piston thereby moving the actuators and the shaft with the cone-shaped pistons along the shaft in a forward direction. At a selected frequency a signal is sent to control the servo valve to change the direction of fluid flow and direct hydraulic fluid to fill the aft actuator piston hydraulic chamber while simultaneously directing flow to evacuate fluid from the forward actuator piston hydraulic chamber thereby moving all of the pistons along the shaft in an aft direction. The swept and pulsed sine wave like signals may be in a range of 2 HZ to 200 HZ, and may be modulated to form sine-like, sawtooth, square, triangle or other shaped signals and thereby vibrating the pistons within each modular chamber to vibrate water within the compression chambers to propagate a vibrational wave at the selected frequencies. The frequency and waveform may be adjusted to reduce cavitation and improve the overall characteristics of the vibrational wave. A positioning sensor attached to end of the piston shaft also provides feedback to the computer control system on the survey vessel to adjust the frequency of the electronic signals to a desired wave form or preset range of frequencies desired over a period of time which adjusts the fluid flow and thereby the frequency of the sound wave propagated out from the vibratory source. The servo valve accepts the fine tuning adjustment of frequencies and rapidly adjusts fluid flow to produce and maintain true, highly reproducible waveforms that match the desired wave form or range of frequencies to allow for the computer control system software to filter and combine amplitudes to reliably determine structural formations of the geological structures miles beneath the bottom of the body of water.

In a further embodiment, an elongated cylindrical elastomeric diaphragm may be attached to the rear of the towing head and to the front of the tail head to encircle the mid-section cylindrical housing. The diaphragm is secured only at the towing and aft heads thereby resting on the clamping rings and forming a tunable space or chamber between the diaphragm and the cylinder housing. The piston compression chambers are filled with fresh water or fresh water mixed with propylene glycol to prevent freezing and a series of ports communicate with the elastomeric diaphragm. Each piston chamber assembly has a plurality of ports that have a combined cross-sectional area greater than the cross-sectional area of the cone-shaped piston to maximize the vibrational flow of water into and out of each compression chamber. As the pistons vibrate, water fills the tunable space within the diaphragm causing the diaphragm to expand and contract at frequencies matching the frequencies of the electrical signals. The entire surface area of the diaphragm becomes a vibratory coupling to the water, spreading the wave form from the ports over a larger uniform surface.

In this aspect of the invention, the diaphragm becomes a sound transmitting member that when immersed in the water has a motion which more truly replicates the desired signal or preset range of frequencies from the control system. In the first part of a vibratory signal cycle that for instance is the rise of a sine wave, the moving water coupling member pushes water away under compression. As the piston draws back and expands the volume within the compression chamber during the fall of the sine wave in the vibratory signal cycle, the coupling member reverses and the outward moving water must reverse its direction to follow the coupling member. At that time there is a rarefication of the pressure between the coupling member and water at the interface between. If the marine vibratory source is being operated in a shallow depth of water, cavitation consisting of a partial vacuum and water vapor may occur at the interface between the coupling member and the water, particularly in warm water when the water within the compression chamber is under tension and low pressure. Cavitation will cause un-wanted spikes in the transmitted sound signal. One solution to this problem is to run the source at deeper depths where the water pressure is higher and the backward movement of the piston or other vibration transmitting member will not easily cause cavitation during its backward stroke.

In a further embodiment of the present invention, a water feed line is provided to add water to the tunable space within the confines of the sound transmitting cylindrical diaphragm. The water may be added or subtracted when the vibratory source is in operation. Since the diaphragm has strength and elasticity it will resist stretching and consequentially the pressure within the diaphragm will increase as additional water is added lessening the possibility of cavitation taking place at the cone-shaped piston surfaces facing the water within the compression chamber. This is an important advantage if the source is to be operated in shallow water for instance in a swamp or near the shore of a body of water. Because the cylindrical diaphragm has more surface area facing the ambient water than the surface area the pistons have facing the water within the chambers, the outside surface of the diaphragm has relatively less motion thus less tendency to cavitate. The water fill line is formed in the auxiliary cover to direct water from the survey vessel through a tubular conduit to fill the space or to release air from beneath the diaphragm thereby reducing cavitation caused by high frequency movement of the pistons, improving the overall frequency response of the vibratory source. The fill line conduit as a vent would further provide for the detection of a broken seal or leaking within the system if air escapes from vent during operation. Additionally, a hydrophone is positioned on the rear surface of the auxiliary hatch to monitor and relay the signal from the vibratory source to the control system as a reference to be used in signal processing. In the illustrative embodiment, the system is operational without the cylindrical diaphragm due to the vibrational pulses formed and expelled from the opposing cone shapes of the piston and bulkhead as described in further detail herein.

In another aspect of the present invention, vibrational accelerations are eliminated and spurious noise is reduced by constructing a dual servo valve system wherein each servo valve is attached to separate actuators and vibratory source assemblies with the forward and aft assemblies positioned in end to end axial alignment. In this configuration, each servo valve controls the movement of each tandem actuator piston assembly and each vibratory source assembly allowing the separate vibratory assemblies to move in synchronization and in opposing directions. Using a single vibratory source, spurious noise and non-harmonic vibrations are caused by movement of the cylinder housing in an opposite direction to the movement of the piston assembly. Due to these opposing forces, as the pistons move for example in an aft direction the cylinder housing unattached to the piston assembly moves in a forward direction and the movement of the cylinder housing causes unwanted noise.

By positioning two vibratory source assemblies end to end each system movement of the cylindrical housing is eliminated reducing overtones and non-harmonic vibrations. Positioning sensors mounted on each piston shaft of the assemblies provide feedback to system controllers to adjust the frequency of each servo control system and thereby the hydraulic fluid flow to the input and output valves of the manifold to synchronize the operation of the forward and aft vibratory assemblies improving the power output amplitude and resolution of sound signals. The sound source's modular construction facilitates making the forward and aft vibratory source assemblies using the appropriate number of cone-shaped piston chambers and appropriate piston shaft length that would be beneficial in various marine seismic explorations and surveying applications.

In a still further embodiment, a water motor may be positioned within the towing head compartment to directly drive the hydraulic pump forming a closed loop hydraulic power system within the marine vibratory source. A water pump on the towing vessel pumps water to the water motor at pressures of for example up to 4000 psi. The water motor is coupled to an axle that spins the hydraulic pump that provides fluid to the manifold, servo valve and actuators. The water is exhausted to the outside of the system into body of water, removing the need for an additional return line to the vessel used by an external hydraulic system. A heat exchanger is affixed along the water output line to provide cooling for the hydraulic output lines of the system as hydraulic fluid is directed back and forth between the actuator piston chambers to vibrate the vibratory source assembly. Using this design the risk of leakage of hydraulic fluid into the body of water is greatly reduced.

In a still further embodiment, sea water may be used in place of the hydraulic fluid to drive the vibratory source assembly. The sea water is pumped from the survey vessel directly through the manifold, servo valve and actuator to power the actuators and vibrate the source at the prescribed swept or pulsed frequency. The exhaust from this system is also directed to the body of water eliminating the costs and necessity of an additional return line to the survey vessel. One or more marine vibratory source systems may be used for greater geological coverage enabling synchronization of a first vibratory source with companion sources that are towed or positioned in or through larger bodies of water.

Another important aspect of the present invention is a reduction in weight of the marine vibratory source device by using hollow pistons of titanium, a titanium piston shaft and hollow bulkheads of stainless steel. Internal gussets and ribs are used to strengthen and support the hollow cylinders of the pistons and bulkheads. The reduction in weight reduces the overall power requirements where less power is needed to actuate and move the hollow pistons.

The system may further have depth control fins to maneuver the device to a prescribed depth. A motor attached to the control fin may automatically adjust the pitch angle of the fins based upon the ambient water pressure and a preset reference pressure. The marine vibratory source may be held at a specific depth by comparing the ambient water pressure to the reference pressure. If the ambient water pressure is higher than the reference pressure the motor turns the control fins clockwise causing an upward force on the marine vibratory source causing it to rise as it is being towed until the set reference pressure is reached. At the desired depth the fins are positioned in a neutral position. If the measured water pressure is lower than the reference, the control fins are turned counterclockwise moving the marine vibratory source to a lower depth. Alternatively, floats may be attached to the fore and aft of the device to adjust the depth of the device.

In accordance with the use of the novel marine vibratory sound source as described herein, it would be advantageous to conduct seismic exploration in a number of marine environments. For instance, marine environments that are near shore or in shallow water where it is difficult to tow a sound source if depths are less than 7.62 in (25 feet), for example. Common survey towing operations are in depths from 7.62 m (25 feet) to 12.19 m (40 feet) and therefore if the water is too shallow to conduct the survey it is advantageous to use the present vibratory sound source for surveying in this type of marine environment where the vibratory source may be towed on the bottom of a body of water. The sleek design having no protrusions which might stick or hang up on water bottom terrain and the air filled chambers of the towing head, tail head and air within the balancing air cavities providing enough buoyancy to make the underwater weight of the source be in a range of from about 226.8 kg (500 pounds) to 317.5 kg (700 pounds), for example thereby making it very lightweight and maneuverable at shallower depths.

The present sound source may also be operated in varying depths of water without changing the characteristics of the signals produced because the low pressure air within the balancing air chambers may be adjusted to match the hydrostatic pressure of the water at the depth of operation. For instance, it may be advantageous to tow the vibratory source to a depth deeper than a standard depth in order to avoid possible problems caused by severe weather where large waves are present. The source may be deployed at such a depth or even if desired on the ocean floor in for example hundreds of feet of water and will function normally because the pressure balancing air will manually or automatically change to match within 1 psi of the water pressure at the operating depth. The present sound source therefore may be operated in a wide range of varying depths and marine environments.

These and other features, advantages and improvements according to this invention will be better understood by reference to the following detailed description and accompanying drawings.

BRIEF DESCRIPTION OF THE DRAWINGS

Several embodiments of the present invention will now be described by way of example only, with reference to the accompanying drawings in which:

FIGS. 6A and 6B is an embodiment of the main bulkhead and actuator housing for the embodiment of the marine vibratory source of the present invention;

FIG. 7 is a side view of a first embodiment of a piston shaft assembly of the embodiment of the marine vibratory source of the present invention;

FIGS. 9A and 9B are a side view of a first embodiment of the stationary bulkhead and piston with clamping ring of the embodiment of the marine vibratory source of the present invention;

FIGS. 10A-10D is a first embodiment of the clamping ring for the embodiment of the marine vibratory source of the present invention;

FIGS. 11A-11C are a first embodiment of the cone-shaped stationary bulkhead of the embodiment of the marine vibratory source of the present invention;

FIGS. 12A-12C are a first embodiment of the cone-shaped piston of the embodiment of the marine vibratory source of the present invention;

FIG. 13A is a top view is a side view of a first embodiment of the actuator piston assembly and a section of the vibratory source assembly of the embodiment of the marine vibratory source of the present invention;

FIG. 13B is a side view of the first embodiment of the actuator piston assembly and a section of the vibratory source assembly of the embodiment of the marine vibratory source of the present invention;

FIG. 14 is a further embodiment of the marine vibratory source of the present invention having an access port for filling the piston chamber assembly;

FIG. 18 is a further embodiment of the marine vibratory source of the present invention having a water motor driving the hydraulic system; and FIG. 19A is a top view of a still further embodiment of the marine vibratory source using sea water as the power delivery fluid with a single hose from the survey vessel.

FIG. 19B is a side view of the still further embodiment of the marine vibratory source using sea water as the power delivery fluid with a single hose from the survey vessel.

DETAILED DESCRIPTION OF THE PREFERRED EMBODIMENTS

Figure 1:
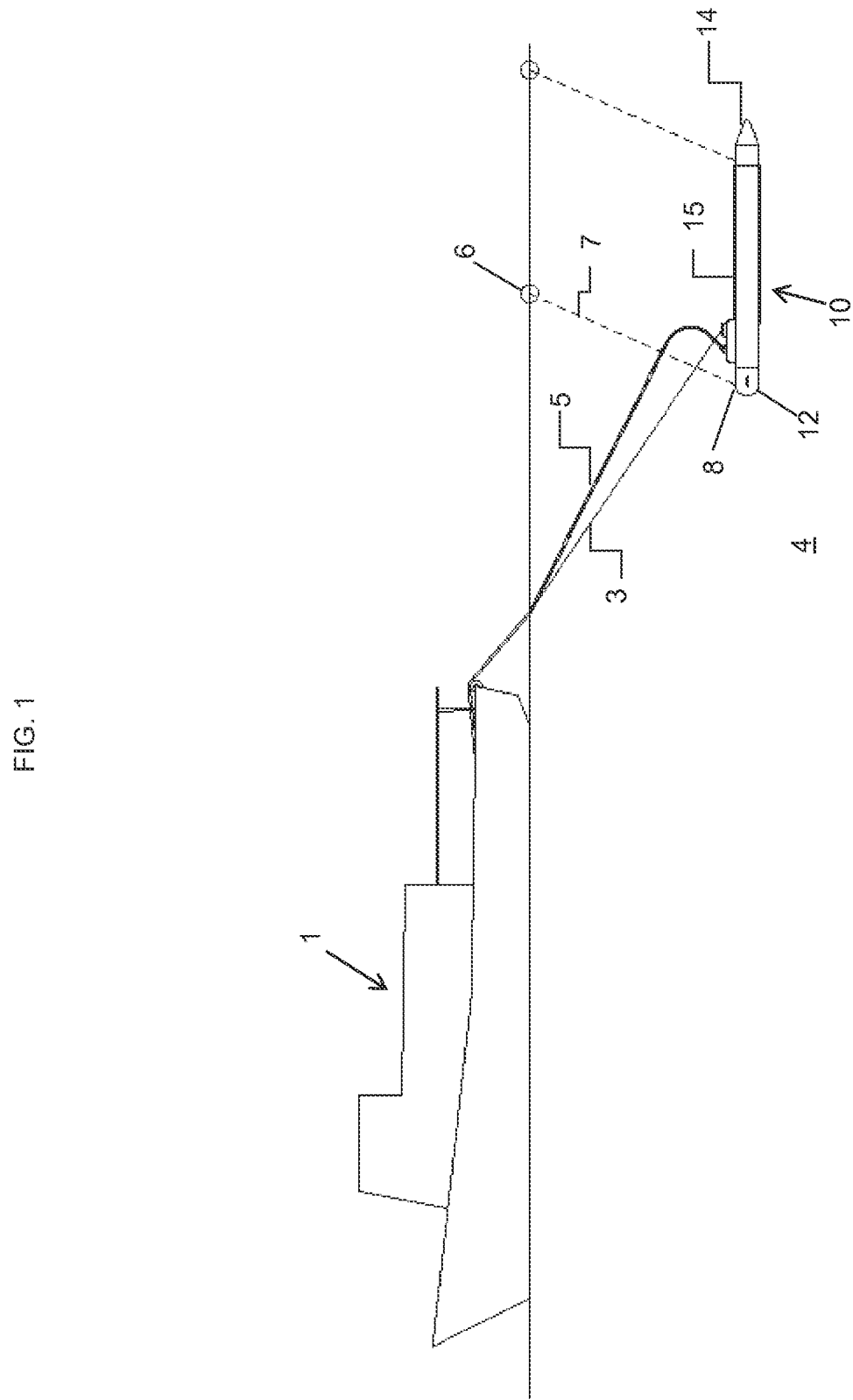
FIG. 1 is a illustration of an embodiment of the marine vibratory source of the present invention with a survey vessel.
Figure 2:
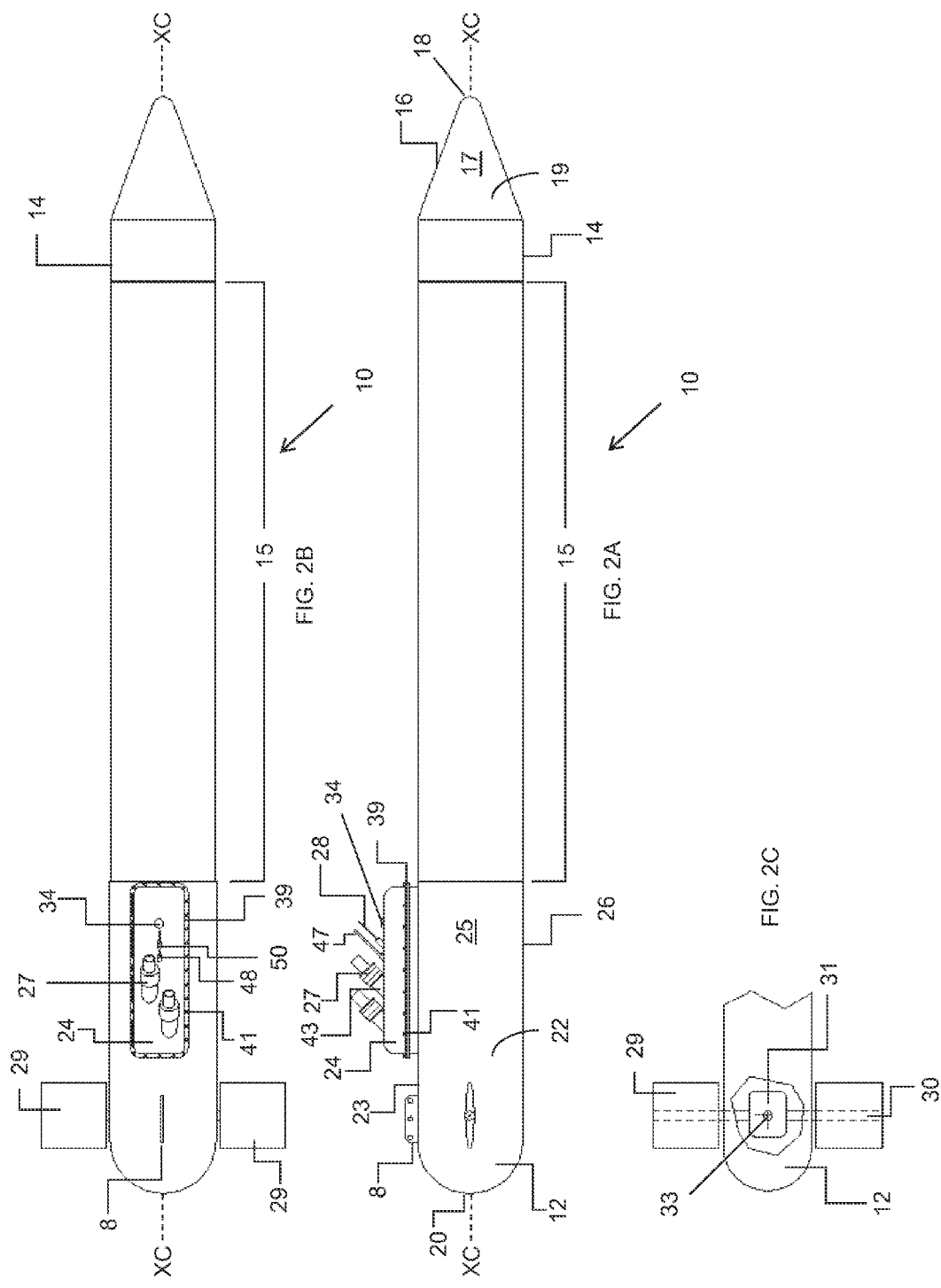
FIG. 2A is a side view of an embodiment of the marine vibratory source of the present invention.
FIG. 2B is a top view of an embodiment of the marine vibratory source of the present invention.
FIG. 2C is a first embodiment of a depth control system of an embodiment of the marine vibratory source of the present invention.

As shown in FIG. 1, a marine vibratory energy source 10 may be towed from a seismic survey vessel 1. The vibratory source 10 is secured to a chain or cable 3 and placed in the body of water 4 requiring seismic surveying. In addition to the towing chain 3, a cable bundle 5 having electrical control lines, hydraulic hoses and air lines is secured from the vessel 1 to the marine vibratory source 10. One or more floats 6 having float chains 7 may also be secured to tow point brackets 8 on the fore and aft sections of the marine vibratory source 10 in order to control and adjust the depth of the device. The vibratory source 10 is elongated, having an overall generally circular cylindrical design with a hydrodynamic towing head 12, and aft tail section 14. These fore and aft sections 12 and 14 are suitably and removably mounted on the front and aft ends of a mid section 15 that may be formed as a long cylindrical tubular housing. The streamlined body of the marine vibratory source 10 is without protrusions or shoulders particularly on the lower portion of the system 10 so that the system 10 may be more easily moved on and off the survey vessel 1 and may be dragged along the bottom of the body of water being surveyed without causing extra friction or drag on the system. The smooth, hydrodynamic shape also deters catching of the system 10 on rock formations or other objects on the bottom of the ocean, lake, pool or other body of water. The mid-section 15 has a longitudinal axis XC as shown in FIG. 2A extending concentrically therein. The mid section 15 may extend to any required length to accommodate the output amplitude required for different survey conditions with for example dimensions from 3 m (10 ft) to 5.5 m (18 feet) but more particularly to approximately 4.6 m (15 ft) so that with the inclusion of the towing head 12 and aft section 14 the overall length along the longitudinal axis XC of the device may be more than 6 in (20 ft) long. The aft section 14 is formed with a compartment 17 in the shape of a tapered cylinder or cone reducing drag and improving maneuverability of the system 10. The aft section shell 16 tapers to a sleek, rounded snub end 18 with a smooth surface 19 of stainless steel or other non-corrosive alloy with aberrations removed to further reduce drag or vibrational interference when the marine vibratory source 10 is in operation.

The nose 20 of the towing section 12 in the forward portion of the marine vibratory source 10 may as well be formed as a tapered cone or as a hemispherical front cap 21. The smooth surface 22 is similarly made from a stainless steel alloy with aberrations removed improving hydrodynamic qualities and reducing drag while being pulled through the water. On the upper surface 23 of the towing section 12 an auxiliary hatch 24 covers the hydraulic and control system components and provides access to the towing head compartment 25. Extending through the auxiliary hatch 24 are one or more hydraulic line attachment ports 27 for the connection of the hydraulic lines, air hoses and electrical lines of the cable bundle 5.

In order to maneuver the vibratory source 10 and cause it to ascend or descend to a prescribed depth, floats 6 and chains 7 may be attached at the tow point brackets 8 at the fore and aft sections 12, 14. The tow point brackets 8 may be made with swivel connectors to improve maneuverability in towing. Alternatively or in addition, depth control fins 29 may be affixed to the towing section 12 to maneuver the system 10 particularly where the system 10 is towed below floating ice. The control fins 29 extend laterally from either side of the towing section 12. Each fin 29 is affixed to an axle 30 that extends through the towing head shell 26 of the system 10 and attaches to a motor 31. The electric or battery powered motor 31 is attached to electronic cables 28 from the cable bundle 5 and is controlled from the surface by an electronics system controller 32 on the survey vessel 1.

A vane position sensor 33 determines the attitude of the depth control fins 29 with the fins in a normal position when the fins align along the XC axis. A dual pressure sensor 34 mounted through the shell 26 of the towing head measures the ambient pressure Pa of the system 10 including the towing head and aft compartments 25, 17 and a series of air cavities 211 and the water pressure Pw outside of the system 10. These pressures Pa, Pw are transmitted to the electronics system controller 32 and adjustments in air flow from the survey vessel 1 are made to maintain air pressure matching the external water pressure Pw that is determined by the depth of the system within the body of water 4.

To adjust the depth of the marine vibratory system 10 using the control fins 29, a reference pressure Pr is selected for a desired depth and a signal is sent from the electronics controller 32 to turn the motor 31 to rotate the control fins 29. The rotation of the control fins 29 is clockwise or counterclockwise based upon a comparison of the ambient system pressure Pa, the external water pressure Pw and the preset reference pressure Pr. The motor 31 rotates the control fins 29 in a clockwise direction if the external water pressure Pw is greater than the reference pressure Pr creating an upward force on the marine vibratory source 10 causing it to rise as it is being towed until the reference pressure Pr is reached. The motor 31 then adjusts the fins 29 to a neutral position along the XC axis to maintain the system 10 at the depth set by the reference pressure Pr. If the water pressure Pw is lower than reference pressure Pr, the motor 31 rotates the control fins 29 in a counterclockwise direction moving the marine vibratory source 10 to a lower depth. Importantly, the control fins 29 provide for slight adjustments to the depth of the system 10 where maintaining the system at a specified depth is critical to synchronize the vibratory source with one or more other systems 10 that are deployed for larger scale geological surveys. Using the control fins 29 or towing chains 7, the marine vibratory source 10 may be towed through the water or be held in a stationary position on the surface or floor at the bottom of the body water. Commonly, systems are towed at depths of 6 m (20 ft) to 10 in (32 ft) with the depth requirements determined by the geological survey being conducted, and the length of control cables and hydraulic lines and the power requirements needed to maintain the system 10 at the desired depth. Based on these requirements, the marine vibratory source 10 may be operated at any depth as described herein.

Figure 3:
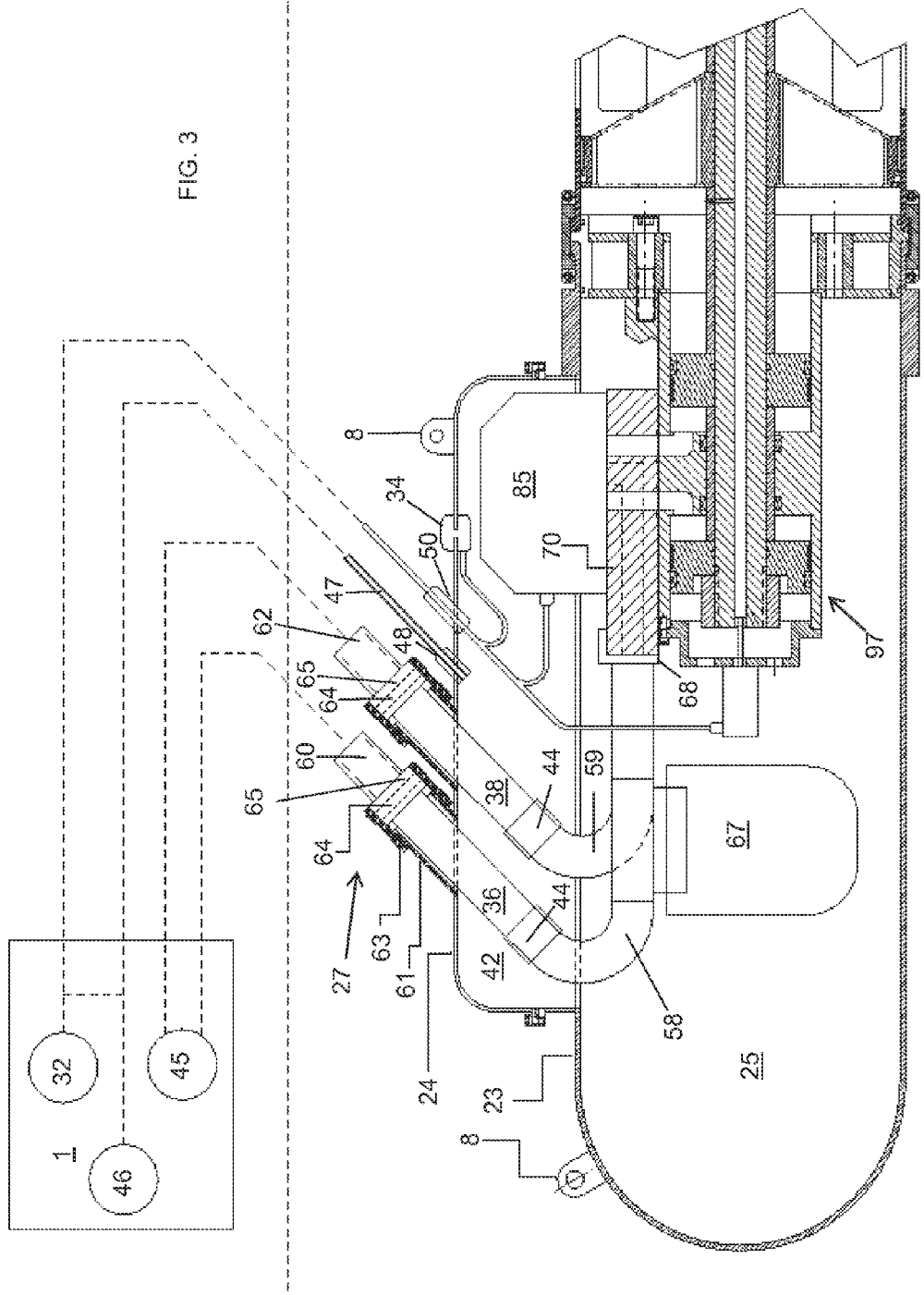
FIG. 3 is a side view of a first embodiment of electrical, air and hydraulic lines and attachments to the embodiment of the marine vibratory source of the present invention.

The ambient air pressure of the internal compartments is controlled from an air compressor 46 and regulator on the vessel 1. The internal compartment pressure and external ambient water pressure is monitored using a dual pressure sensor 34 mounted on the shell 26 of the towing head. Compressed air is fed through air lines 47 within the cable bundle 5 and connected to a sealed fitting 48 on the auxiliary hatch 24. As shown in a top view of the system in FIG. 2B, adjacent to the air line connector 48, one or more electrical connectors 50 are distributed through the surface of the auxiliary hatch 24 for transmission of electricity and control signals to the internal system components. An input hydraulic line 60 attaches to a detachable fitting 64 of the attachment port 27 and secures the hydraulic line to the auxiliary hatch 24, as shown in FIG. 3. The input hydraulic line 60 supplies high pressure hydraulic fluid to the system and a hydraulic return line 62 expels fluid that has entered and gone through the system returning the fluid to the survey vessel 1 in a closed loop hydraulic system. A hydraulic pump 45, located on the survey vessel 1, pumps fluid through the hydraulic system at rates of 100 GPM to 250 GPM and at pressures up to 3000 psi for example.

The auxiliary hatch 24 is affixed to the surface 23 of the towing head shell 26 using a bolting flange 39 with a series of bolts 41 and gasket (not shown) to create an air tight seal of the hatch 24 to the towing head 12. The attachment ports 27 may be offset from one another to provide additional space around each port 27 for the attachment of the hydraulic lines

60, 62. Each attachment port 27 for the hydraulic input and output lines is formed with an angled stainless steel tubular support 61 that surrounds and extends from a separate opening for each line within the cover of the auxiliary hatch 24. A main fluid delivery assembly has a main input conduit 36 and main output conduit 38 that each extend out and through each hatch opening and through the angled support tubes 61 to connect with the detachable hydraulic fitting 64. The hatch openings are of a larger diameter that the main conduits 36, 38 to allow for main fluid delivery assembly to vibrate within the larger diameter openings as high pressure hydraulic fluid is fed in and out of the servo valve 85 thereby preventing damage to the servo valve and other components as high pressure hydraulic fluid is directed back and forth through the system 10. A steel spacer 65 surrounds each detachable fitting 64 extending the diameter of the pipe fitting 64 to match the diameter of the angled support tube 61 so that a rubber or elastic hose jumper 63 may be slid over both the support tube 61 and spacer 65 of each attachment port 27. The hose jumper 63 absorbs vibrations and provides dampening at the hose connection correcting for misalignment and tolerance stack up of components as high pressure fluid flows through the system during operation of the marine vibratory source 10. The support tube 61 extends at an acute angle directing the attachment port 27 in a direction opposite to the direction of tow from the survey vessel 1. This angle is in a range between 20° and 60° and more preferably 45° for example relative to the XC axis creating an opposing curve in the cable bundle 5 thereby releasing stresses on the high pressure hydraulic lines as the marine vibratory source 10 is towed through the body of water 4. Detachable pipe fittings 44 and the multi-pin electrical connectors within the auxiliary hatch 24 provide for the disconnection of the main input and output conduits 36, 38 from internal piping in order to remove the hatch cover. Removal of the auxiliary hatch 24 provides access to the hydraulic connections and servo valve 85 located within the hatch compartment 42.

Figure 4:
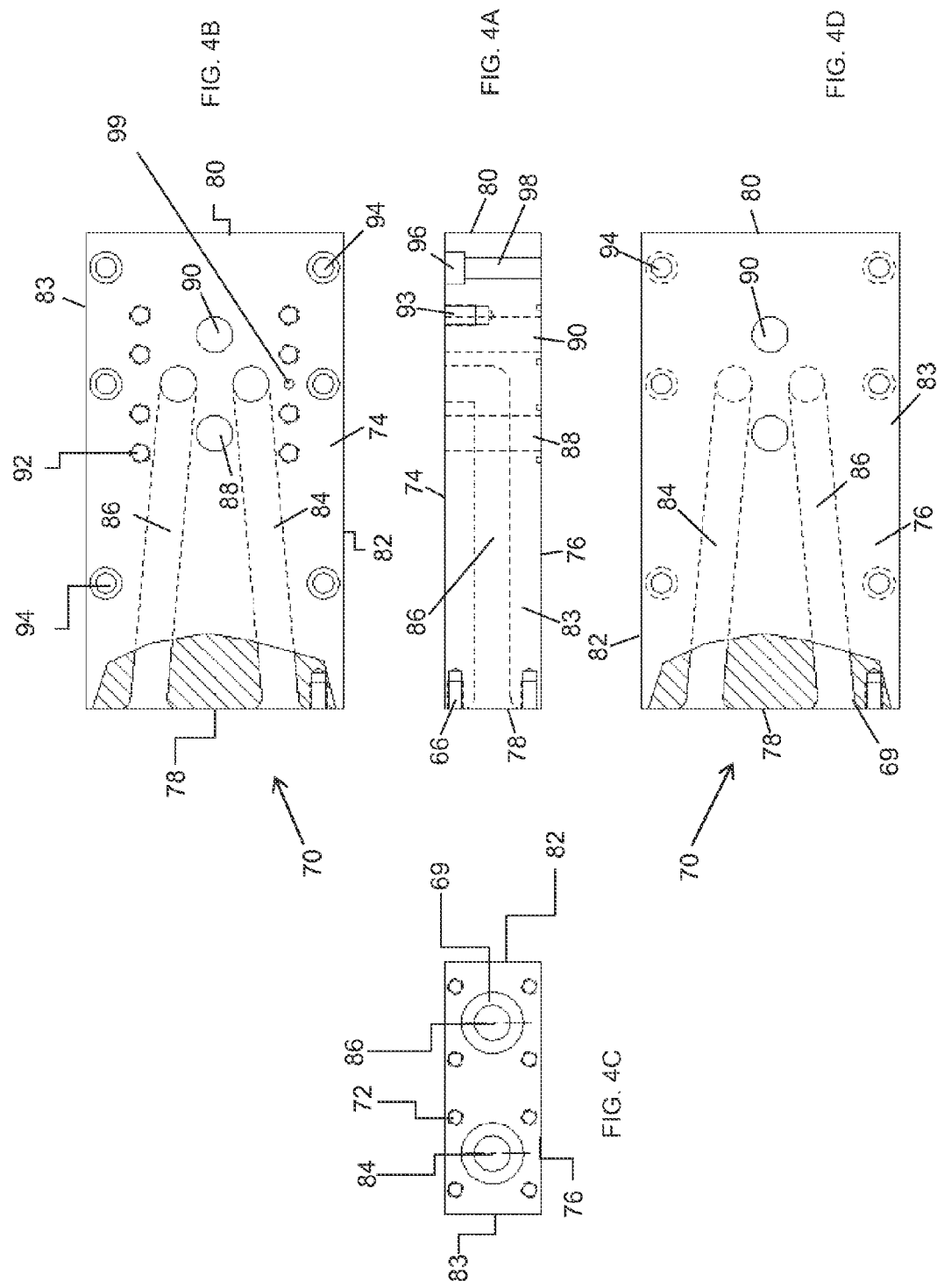
FIGS. 4A-4D is a first embodiment of a manifold for the embodiment of the marine vibratory source of the present invention.

An internal pipe fitting 44 attaches to each of the curved steel input conduit 58 and output conduit 59 to direct hydraulic fluid from each hydraulic line 60, 62 to and from the manifold 70. A pulse dampener 67 is positioned within the fluid path of each conduit 58, 59. The pulse dampener 67 acts to smooth pulsations protecting system components as large amounts of high pressure hydraulic fluid is forced through the hydraulic lines. The curved conduits 58, 59 attach to the manifold 70 using a mounting flange 68 that is welded to each conduit 58, 59 and mated to the manifold 70. As shown in FIGS. 4A-4D, the mounting flange 68 is secured to the manifold 70 using bolts 66 that are inserted into threaded holes 72 in the manifold block as shown in FIG. 4C. The curved conduits 58, 59 may be of a larger diameter than the input delivery bore 84 and the output return bore 86 of the manifold 70 and therefore a radius 69 may be formed to direct fluid to the smaller diameter bores 84, 86. Within each radius 69, an O-ring (not shown) is positioned to seal the mounting flange 68 to the manifold 70.

The manifold 70 is constructed of a block of stainless steel having an upper surface 74 a lower surface 76, a first end 78 for fluid connection, an opposing end 80 and a first side edge 82, and second side edge 83. The fluid connection end 78 is drilled with the two passageways for the input delivery bore 84 and the return bore 86 for the hydraulic fluid to enter from and return to the hydraulic pump 45 in the closed loop hydraulic system. The bore passageways 84, 86 are angled and directed from each side edge 82, 83 of the manifold 70 to a central portion thereby providing sufficient space for attachment of the mounting flange 68 and each of the curved conduits 58, 59. The angled passageways 84, 86 further reduce the length of travel of the hydraulic fluid within the servo valve 85 improving the frequency response of the system.

A series of threaded holes 92 are provided on the top surface 74 of the manifold block 70 for the attachment of the servo valve 85 directly to the manifold 70. A direct connection of the servo valve 85 to the manifold shortens hydraulic fluid passages, reduces the risk of leaks and removes delays in delivery of fluid in and through the system. As shown in FIG. 4A, bolts 93 (a single bolt is shown for clarity) for attachment of the servo valve 85, thread into the holes 92 and extend partially through the manifold block 70. Along the outer edges 82, 83 of the manifold block 70, a set of bolt holes 94 are provided for attachment of the manifold 70 directly to the piston actuator assembly 97. A recess 96 within each hole 94 may be formed for the bolts 98 to be tightened flush to the substantially flat surface 74 of the manifold 70. One or more locator pins 99 may extend from the upper surface 74 to mate with an opening or détente and align the servo valve 85 with the hydraulic passageways. Within the central portion, a vertical forward delivery bore 88 is formed through the manifold block 70 to communicate with the forward hydraulic chamber 106 of forward actuator piston 100 of the actuator piston assembly 97. Along the longitudinal axis XC, a second vertical aft delivery bore 90 is formed to communicate with the hydraulic chamber 108 of the aft actuator piston 102. The forward and aft hydraulic chambers 106, 108 and actuator pistons 100, 102 are similarly dimensioned providing substantially similar force in the fore and aft direction.

Figure 5:
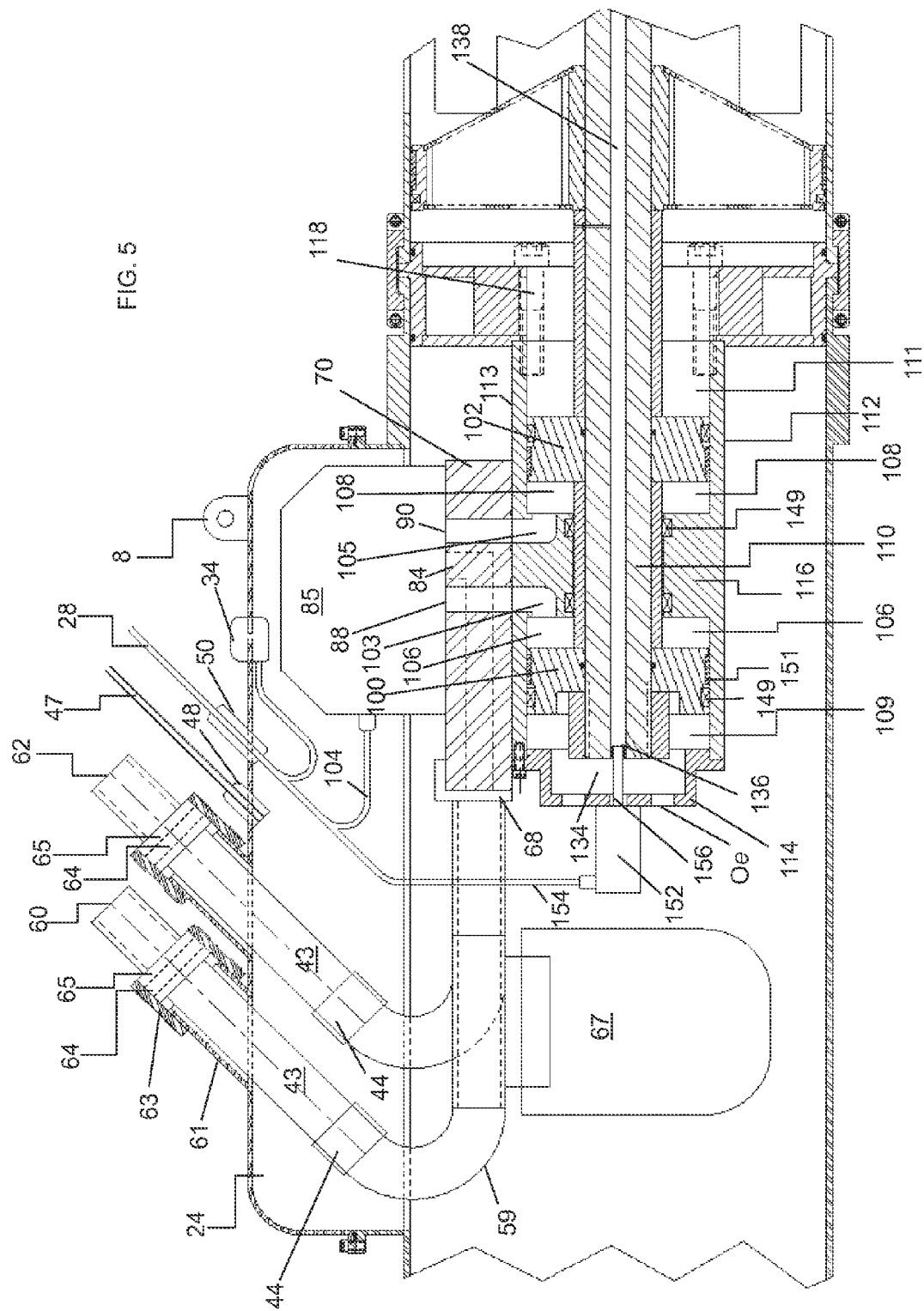
FIG. 5 is a side view of a first embodiment of an actuator system of the embodiment of the marine vibratory source of the present invention.

In the illustrative embodiment as shown in FIG. 5, the marine vibratory source 10 uses two separate actuator pistons 100, 102 mounted to the piston shaft 110 and positioned directly adjacent the manifold 70. Using the arrangement of two separate actuator pistons and the direct mounting of the servo valve 85 and manifold 70 on the actuator piston assembly 97, the length and complexity of the hydraulic lines is greatly reduced where an extension of a hydraulic line to the opposing side of a single piston assembly is unnecessary. Each of the actuator pistons 100, 102 have a minimal length delivery conduit 103, 105 to the manifold 70 to expel overflow from each actuation. Importantly, the entire vertical delivery bore 88, 90 and delivery conduits 103, 105 are of a length that is shorter than the diameter of one of the actuator pistons.

As hydraulic fluid is provided to the forward actuator piston hydraulic chamber 106, simultaneously fluid is expelled from the aft actuator piston hydraulic chamber 108 and the actuator pistons 100 and 102 move the piston shaft 110 with the pistons 170 of the vibratory source assembly 175 in a forward direction. Alternatively, supplying fluid to the aft actuator piston hydraulic chamber 108 while simultaneously expelling fluid from the forward actuator piston hydraulic chamber 106, the actuator pistons 100, 102 and piston shaft 110 move in the aft direction. The actuator pistons 100, 102 are mounted along the piston shaft 110 within the square housing 112 of the actuator piston assembly 97. The stainless steel housing 112 extends from the main bulkhead 120 to a front cap 114 and surrounds the actuator pistons 100, 102 and piston shaft 110 within the towing head compartment 25. The manifold 70 sits on the flat upper surface 113 of the housing 112 and the piston conduits 103, 105 are centered in the actuator piston bulkhead 116 of the actuator housing 112 and are formed as passages that directly communicate with the manifold 70. Each of the piston conduits 103, 105 are spaced symmetrically from the midpoint of the actuator housing bulkhead 116 thereby aligning with the delivery bores 88 and 90 and servo valve 85.

As shown in FIGS. 6A and 6B, the actuator piston assembly housing 112 is attached to the main bulkhead 120 using a series of bolts 118 that are positioned around a central opening O within the bulkhead 120. Bolt holes 119 within the bulkhead 120 align the bulkhead with the face 117 of the square actuator housing 112 supporting the housing 112 within the main towing head compartment 25. The main bulkhead 120 is of a hollow construction with rib supports 122 extending from an interior cylinder 124 to an exterior cylinder 126 forming hollow sections 128. A first circular disc 127 forms the forward wall and encloses the towing head compartment 25, a portion of which abuts the front face 117 of the actuator housing 112. The actuator housing 112 is mounted along the XC axis providing a flat surface for attachment of the manifold 70. As shown in FIG. 6A, the bolt holes 119 for the actuator housing extend at a 45° angle β from the axis YC perpendicular to the longitudinal axis XC. In this orientation, the threaded bolt holes 119 are within the corners of the square face 117 of the actuator housing 112 which are not completely shown as going through the main bulkhead 120 in the planar side view of FIG. 6B. A second circular disc 129 encloses the hollow portion 128 of the main bulkhead 120 with each cylinder 127, 129 being welded to the interior and exterior cylinders 124, 126 of the main bulkhead 120. The construction of the main bulkhead with ribs 122 and hollow sections 128 further reduces the overall system 10 weight. The main bulkhead exterior cylinder 126 is formed with a central flange 130 for attachment of the bulkhead 120 to the cylindrical housing 174 of a piston assembly chamber 177 using a clamping ring 179 as described in further detail herein.

The piston shaft 110 extends through the central opening O of the main bulkhead 120 and through a bore Oa in the actuator housing bulkhead 116 to the front cap 114 of the actuator housing 112. The piston shaft 110, as shown in FIG. 7, has a threaded extension 140 on each of the forward and aft ends 142, 144. In assembly, seals 149 are installed in the bore Oa of the actuator housing bulkhead 116 and the actuator piston spacer 148a is installed and centered within the bore Oa. Seals 149 and rider ring bearings 151 are installed on the outer cylinders of the actuator pistons 100, 102 and the forward actuator piston 100 is positioned through the actuator housing 112 to abut the forward end of the housing bulkhead 116. The aft actuator piston 102 is positioned through the opening in the main bulkhead O and the bore Oa of the actuator housing 112 to abut the aft end of the bulkhead 116. The piston shaft 110, supported on a horizontal stand, is inserted through the aft actuator piston 102, the actuator piston spacer 148a within the actuator housing bore Oa to a point extending through the forward actuator piston 100. The end nut 146 is attached to the forward end 142 of the shaft and tightened flush to the piston shaft 110. The front cap 114 is installed to the actuator housing 112. The internal diameter da of the actuator pistons 100, 102 and the diameter ds of the spacer 148 are dimensioned as substantially the same as the outside diameter Ds of the piston shaft 110 mating the metallic surfaces of the piston shaft 110 to the inner surfaces of each cylinder and spacer 148. The wall thickness is of the spacer sleeve 148a is ½" for example. The bore Oa of the bulkhead 116 having an internal diameter Da slightly larger than the total diameter of the piston shaft 110 and twice the wall thickness 2ts of the spacer sleeve 148a. The seals 149 and rider ring bearings 151 seal the actuator hydraulic chambers 106 and 108 from the actuator compression chambers 109 and 111 and reduce friction between the actuator 100, 102 and actuator housing 112 as the actuators move within the housing. The main bulkhead 120 is slid along the shaft 110 and attached to the actuator housing 112.

Figure 8A:
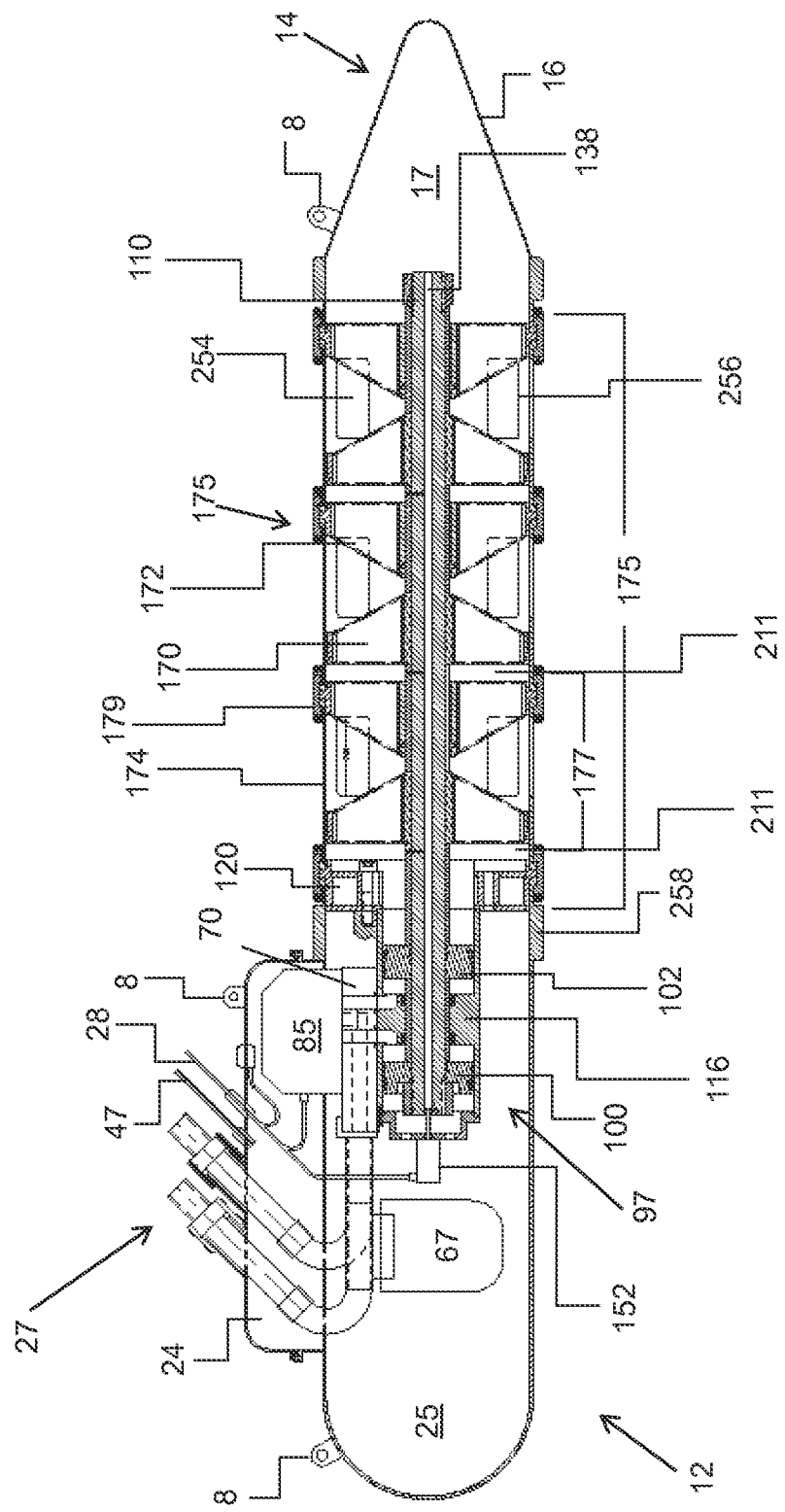
FIG. 8A is a side view of a first embodiment of the vibratory source assembly of the embodiment of the marine vibratory source of the present invention.

A second spacer sleeve 148b is slid along the shaft 110 and extends through the opening O in the main bulkhead 120 and is positioned adjacent the aft actuator 102. A seal 149 and rider ring 151 are installed on the outer diameter OD of a first cone-shaped piston 170a and an O-ring seal 147 is slid along the shaft 110 to the second spacer sleeve 148b. The first piston 170a is slid along the shaft 110 to abut the O-ring 147 and spacer 148b. A first cylindrical housing 174a, as shown in FIG. 8A of the first piston chamber assembly 177a is pushed over the rider ring 151 and seal 149 onto the pilot diameter of the main bulkhead 120. The housing 174a has an extended rim 205 that slides up and against the maim bulkhead central flange 130. A temporary clamp ring may be used to hold the housing in place against the flange. A third spacer sleeve 148c and O-ring seal 147 are installed along the piston shaft 110 and into place against the inner hub 243 of the first cone-shaped piston 170a. A seal 206, as shown in FIG. 9A, is installed along the outer diameter of a first stationary bulkhead 172a and an O-ring 215 is installed within a groove 213 formed with the interior cylinder 229 of the stationary bulkhead. The first stationary bulkhead 172a is slid over the spacer sleeve 148c with the extended rim 205 of the cylindrical housing 174a sliding over the front pilot diameter 201 of the bulkhead 172a to slide against the stationary bulkhead central flange 199. A second cone-shaped piston 170b is installed with seals 149 and rider rings 151 and slid along the piston shaft 110 to the spacer sleeve 148c. An air cavity 211 is formed where the spacer sleeve 148c extends beyond the end of the stationary cylinder 172a and meets the second piston shaft 170b. The seals installed along the outer diameter 206 and the inner diameter 215 of the stationary cylinder and the seals 149 and O-ring 147 prevent water from entering the air cavity 211. An air conduit 217 is formed through the piston shaft 110 and spacer 148 to fill the air cavity 211. The extended rim 205 of a second cylindrical housing 174b is slid over the rear pilot diameter 203 of the first stationary bulkhead 172a. A second stationary bulkhead 172b is installed and the installation steps are repeated for the appropriate number of piston chamber assemblies 177 as are needed. The end nut 140 is installed on the end of the piston shaft 110 to secure each cone-shaped piston 170 and spacer 148 in place along the shaft forming a composite piston as a single unit that moves in unison through the openings in each bulkhead 172. The aft shell 16 is slid around the pilot diameter of the stationary bulkhead 172 of the final piston chamber assembly 177 and similarly secured using a clamping ring.

The main bulkhead 120, each piston chamber assembly 177 and the aft shell 16 are each secured to one another end to end using a three-part flange clamping ring 179. The clamping ring 179, as shown in FIGS. 10A-10D, is made of rigid stainless steel formed as a semi-circle or other partial circular diameter to extend around the pilot diameter of the bulkheads. The clamping ring 179 has an outer surface semi-circular diameter 181 and an inner surface semi-circular diameter 183 with the inner surface diameter 181 having two opposing flanges 185 perpendicular to the inner diameter 183. Each opposing flange 185 runs along each outer edge and along the entire inner semi-circular circumference 183 of the clamping ring 179 as shown in FIG. 10D. Along each flange 185 are rounded inner corners 187 best shown in FIG. 9A to reduce stress in compressing the extended rim 205 of the cylindrical housings 174 to the central flange of the main bulkhead 130 and the stationary bulkhead 199. A tight fit is formed within the flange 185 as the stainless steel rim 205 of the housings and central flange 130 or 199 are wedged within the clamping ring 179. A first and second clamping ring 179a, 179b are mated using threaded connectors 189 from a first end 191 of the clamping ring 179 with capture screws 193 or other attachment fixtures such as a nut and bolt affixed to the opposing end 195 of the clamping ring 179 forming a circular ring around the outer diameter of the bulkhead, as shown in FIG. 10A. As shown in FIG. 10C, the threaded connector 189 and attachment screws 193 are flush with the outer surface 181 and the outer surface 181 of the ring 179 is deburred and radiused to remove protrusions and aberrations thereby maintaining a sleek surface to reduce drag on the system 10 and assist in moving the system 10 on and off of the vessel 1. The radiused edges also provide a smooth surface for the elastomeric diaphragm 197 to surround the vibratory source assembly 175 and rest upon.

The stationary bulkhead 172, as shown in FIG. 11A, is formed with a central opening Ob that has a larger diameter Db than the diameter Dp of the cone-shaped piston 170 shown in FIG. 12A. The diameter Db of the stationary bulkhead is the total diameter of the piston shaft 110 and twice the thickness $2ts$ of the spacer sleeve 148 that surrounds the piston shaft 110 and positions the pistons 170 along the shaft 110. The stationary bulkhead 172 is not attached to the piston shaft 110 or spacer 148 allowing thr the shaft 110 and pistons 170 to move back and forth through the stationary bulkhead opening Ob. The cone-shaped piston 170 is not attached to the cylinder housing and rides within the chamber housing 174 with a series of rider ring bearings 151 surrounding the cone-shaped piston to reduce friction between the piston 170 and housing 174. As shown in FIGS. 11A-11C, the stationary bulkhead 172 has a cone-shaped face 227 that extends from the bulkhead cylinder 200 to the center opening Ob at an angle $\alpha 3$ from the axis Ab of the cylinder 200. The angle $\alpha 3$ is between 20 to 70 degrees and more preferably at an angle of 60 degrees for example. The opening Ob is formed by an internal cylinder 229 that includes the groove 213 with the O-ring 215 as shown in FIG. 11C to seal the bulkhead 172 around the spacer cylinder 148. The O-rings 215 are formed of tough resilient material, for example such as polyurethane having a Durometer rating in a range from about 70 to about 90. The hollow interior 231 of the bulkhead 172 is supported by a series of radially positioned ribs 233 that have one or more tongues 235 or tabs that extend through and are welded to the face 227 of the bulkhead 172. The stationary bulkheads 172 may be made of a non-corrosive metallic material such 17-4 ph stainless steel alloy and their hollow construction further reduces the overall system weight of the marine vibratory source 10. The rear surface 237 of the bulkhead 172, as shown in FIG. 11A, is substantially flat and has a series of openings Oc that allow for compressed air to be fed into the hollow bulkhead interiors 231.

As shown in FIGS. 12A-12C, the cone-shaped piston 170 is formed in a similar manner to the stationary bulkhead 172 with a cone-shaped face 239 that extends from an outer cylinder 241 to the center opening Op at an angle $\alpha 4$ from the axis Ap of the cylinder 241. The angle $\alpha 4$ is between 20 to 70 degrees and more preferably at an angle of roughly 60 degrees. The opening Op is formed by an internal cylinder 243 that includes cutouts 245 for the placement of the O-rings 147 between the cone-shaped piston 170 and spacer sleeve 148. A series of radially positioned ribs 247 are welded to and extend from the flat rear surface 249 of the cone-shaped piston 170 to support the cone-shaped face 239 forming hollow interior compartments 251. Each of the ribs 249 have one or more tongues 253 or tabs that extend through and are welded to the face 239 of the piston 170. The rear surface 249 of the piston 170, as shown in FIG. 12A, has a series of openings Oc that allow for the hollow piston chambers 251 to be filled with compressed air. The piston diameter Dp may be of any suitable dimension with a possible range of from 15.24 cm (6 in) to 152.40 cm (60 in) for example although much larger or much smaller dimensions are contemplated within the scope of the present invention. The diameter of the central opening Op is determined by the piston shaft diameter Ds depending upon the chosen piston diameters Dp. The stationary bulkhead 172 is similarly dimensioned to the piston 170 to match or be similar to the conic surface area of the piston face 239 to optimize the amplitude of the vibrational-coupling area. Within each piston chamber assembly 177, the cone-shaped face 239 of the piston is positioned opposing the cone-shaped face 227 of the stationary bulkhead 172 forming a reduced volume hourglass shaped compression chamber 254 around the piston shaft 110 as shown in FIG. 13B. This important feature of the present invention reduces the volume of water vibrated within the chamber 254 thereby lowering the overall power requirements of the system 10.

The air cavities 211 between the rear surfaces of the pistons 170 and stationary bulkheads 172 are fed low pressure through a groove 219 and a drilled passage 220 in the spacer sleeve 148 connecting to small openings 217 in the piston shaft 110. These openings 217 connect to a main air conduit 138 within the piston shaft 110. The main air conduit 138 extends the entire length of the piston shaft 110, feeding the air cavities 211 and providing air to the aft compartment 17. The main air conduit 138 is supplied by a small air passage 136 that connects the main air conduit 138 to an air chamber 134 within the front cap 114 of the actuator housing 112. A series of openings Oe are formed within the cap 114 that allow air to flow from the fore compartment 25 to the air chamber 134. The air chamber 134 also communicates with the forward piston actuator chamber 109 providing an air cushion for the piston 100 as the actuator moves back and forth within the actuator housing 112. A second actuator chamber 111 for the aft actuator 102 is similarly filled with compressed air from the shaft air passage 217 and opening O in the main bulkhead 120. The front cap air chamber 134 also prevents pressure build up at the end 142 of the piston shaft 110 as compressed air is pushed freely in and out of the chamber 134 as the actuators 100, 102 and shaft 110 move back and forth during operation.

The system 10 automatically controls the interior low pressure air within the air cavities 211 to within +/−1 psi of ambient water pressure and therefore the interior system pressure has minimal effect on piston dynamics. These adjustments may be made prior to or during operation of the actuator pistons 100, 102 vibrating the vibratory source assembly 175. Properly adjusted pressures provide for the actuators to see equal forces at a neutral position prior to activation and in operation. Using the dual pressure sensor 34, the internal and external pressures are constantly monitored and minimal pressure changes are automatically accommodated for by regulating air pressure from the control system 32 of survey vessel 1. The ability to maintain minimal pressure changes while in operation is a critical feature, where even small pressure changes of for example 10 psi will unbalance the force on the pistons. As an example, a marine vibratory system may have seven piston chamber assemblies and therefore seven sets of vibration transmitting pistons, with each piston having a frontal cross sectional area of 260 in$^2$ for a combined total of 1819 in$^2$. The hydraulic actuator pistons have a cross sectional area of 41 in$^2$. Each one pound per square inch of pressure within the balancing air pressure volumes of the seven pistons combined exerts a force of 1819 pounds.

Assuming an operating pressure of 1000 psi hydraulic pressure in the actuator has an operating force of 41 in$^2$×1000 psi resulting in a force of 41,000 pounds of force produced by the actuator.

If the system is run at 1 psi, air pressure in the balancing air pressure cavities, the 1819 pounds of force exerted by the 1 psi will add to the 41,000 pounds of force when the piston assembly moves in the aft direction making a total force of 42,819 pounds of force pushing water out of the ports. When the piston assembly moves in the fore direction, the 1819 pounds of force is subtracted from the 41,000 pounds of force realizing a force of 39,181 pounds available for pulling in water through the ports resulting in a difference of 3,638 pounds of force between the fore and aft motions of the piston assembly, an acceptable differential. However, if a balancing pressure of 10 psi were to be applied within the balancing air pressure cavities, the force exerted by the actuator and piston assembly in the aft direction would be 41,000+18,190 equaling 59,190 pounds force. In the fore direction of travel the 18,190 pounds exerted by the ten psi within the balancing volumes would subtract from the 41,000 pounds leaving 41,000-18190 equaling 22,810 pounds of force available for forward motion of the pistons assembly. This difference of 59,190-22810 is equal to 36,380, an unacceptable differential. This large discrepancy between the aft piston assembly motion and the forward piston assembly motion would cause a unacceptable distortion of the sine like wave form in comparison to the desired signal of the source. Thus, for example, the pressure range of between 35 psi to 110 psi within the balancing pressure air cavity in U.S. Pat. No. 6,464,035 would cause the system disclosed in the prior art to be non-operational. The automated air regulators control the adjustments to the internal air pressure to maintain the system 10 at +/−1 psi of the ambient water preventing distortions caused by unbalanced pressures within the system.

Affixed at the front cap 114 is a digital position sensor 152 that monitors the position of the piston shaft 110 as it vibrates with the vibratory source assembly 175. An optical, electrical or mechanical indicator 156 is attached to the sensor to identify the position and speed of the piston as it moves back and forth. The electronic system controller 32 on the vessel 1 compares the transmitted speed and position and makes slight adjustments to the electronic frequency and therefore fluid flow to the servo valve 85. Using the system controller 32 and feedback adjustments the vibratory output of the marine vibratory system 10 may be synchronized with other such vibratory sound sources being towed by the vessel 1 or other vessels to increase the power amplification of sound. Adjustments may also be made to swept frequency signals to improve reproducibility where the signal may begin at a lower frequency and gradually step through a range of higher frequencies over a period of fifteen seconds or more. The gradual rise of swept frequency or using a pulsed signal provides for deconstruction software as part of the controller system 32 to plot and evaluate the vibratory wave patterns determine anomalies that may indicate various geological formations beneath the bottom surface of the body of water. Critical to operation is the reproducibility and resolution in waveforms to properly deconstruct the emission. Using feedback from the position sensor 152, signal adjustments from the controller 32 may also be used to synchronize a second vibratory source within a dual servo valve and actuator system as described in further detail herein.

In operation the servo valve 85 receives an electronic frequency signal through a control cable 104 that extends from the electric cables 53 of the cable bundle 5. The signal activates the servo valve 85 to direct flow from the hydraulic input line 60 through the manifold input passageway 84, through the servo valve 85 and into the forward delivery bore 88 of the manifold filling the forward actuator piston hydraulic chamber 106. Simultaneously, the servo valve 85 directs flow from the aft piston hydraulic chamber 108 through the aft manifold bore 90 through the servo valve 85 and out through the output passageway 86 to the output hydraulic line 62 evacuating the aft actuator hydraulic chamber 108. As fluid fills the forward hydraulic chamber 106 and is emptied from the aft hydraulic chamber 108 the forward actuator piston 100 and aft actuator piston 102 move in a forward or first direction moving the piston shaft 110 and cone-shaped pistons 170 forward. A second electronic frequency signal is sent to the servo valve 85 switching the direction of flow from the input line 60 to the aft manifold delivery bore 90 filling the aft actuator piston hydraulic chamber 108 and simultaneously switching the output of flow from the forward actuator hydraulic chamber 106 through the manifold bore 88 and the servo valve 85 to the output hydraulic line 62 moving the shaft and cone-shaped pistons in the aft or opposing direction.

The signals from the electronic controller 32 may be at swept or pulsed frequencies in any modulated waveform and in a range from 2 Hz to 200 Hz, for example. In its operation, the servo valve 85 responds to these signals for regulating the flow of high-pressure hydraulic liquid to the forward and aft actuator pistons 100 and 102 causing the actuators to vibrate the piston shaft 110 in conjunction with the pistons 170 back and forth. The pistons 170 within the vibratory source assembly 175 are thereby vibrated back and forth axially causing water within the compression chamber 254 to vibrate out and in through the multiple ports 256 in the cylindrical housing 174 creating vibratory waves that propagate into the surrounding body of water and through the geological structures beneath the body of water. If there is one installed, the sound is used to expand and contract an elastomeric diaphragm 260 as described in further detail herein. The system is completely operational without the diaphragm 260 where large ports 256 are used to force the water out and through the cylindrical housing 174.

Figure 8B:
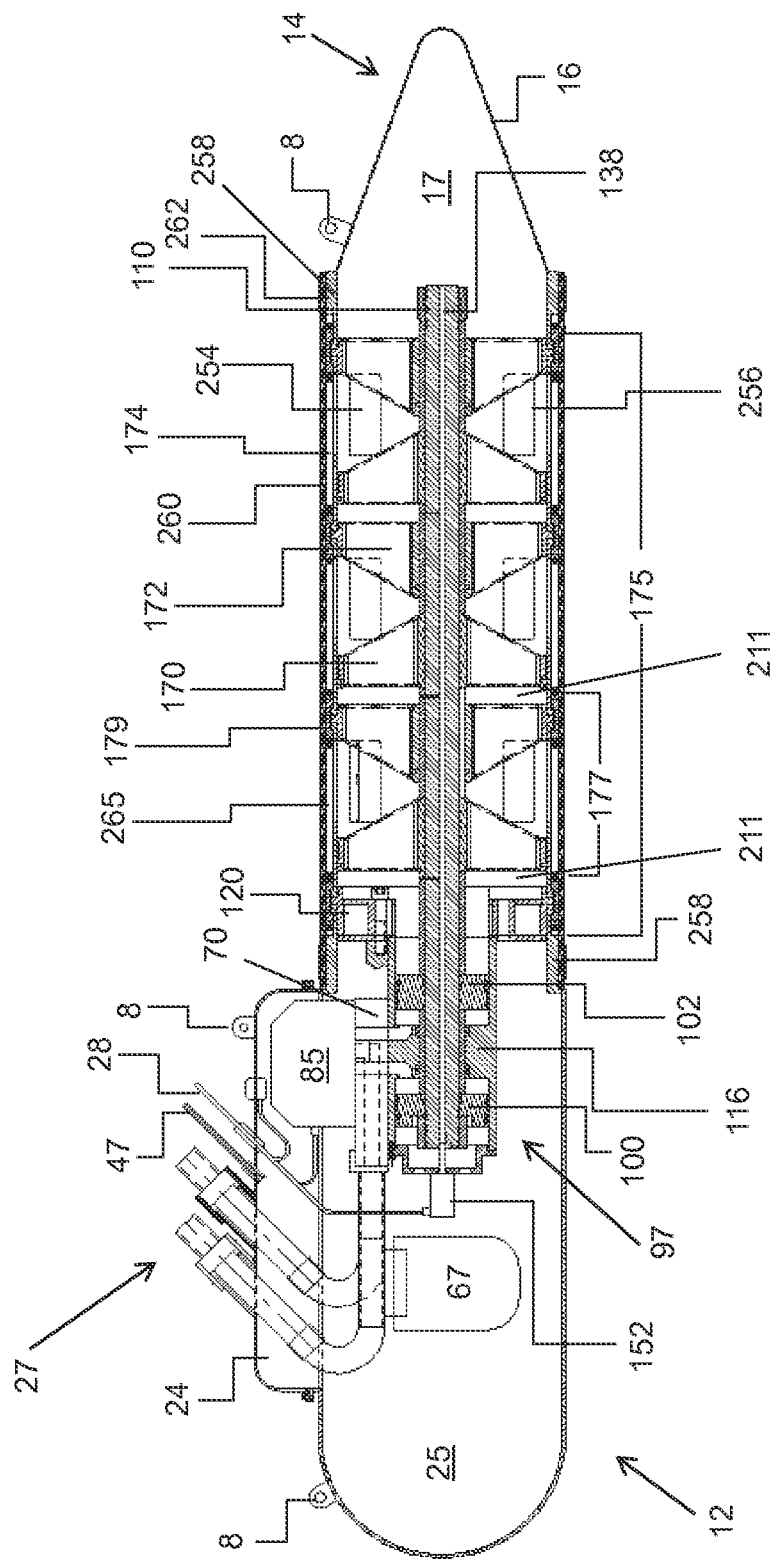
FIG. 8B is a side view of the vibratory source assembly having a sound transmitting coupling member in a further embodiment of the marine vibratory source of the present invention.

In this further embodiment, as shown in FIG. 8B, the sound transmitting diaphragm 260 surrounds the vibratory source assembly 175 of the midsection 15 and models the vibratory emissions of the pistons 170 providing a large vibrational-coupling surface area in contact with the body of water. The diaphragm 260 is of an elastomeric material formed as a seamless sheet or cylinder that surrounds the system 10 having a diameter slightly larger than the clamping rings 179 of the cylindrical housing 174. The diaphragm 260 vibrates in its entirety pulsing at frequencies matching the sweeping or pulse frequencies sent from the control system to the servo valve 85 as fluid is pumped in and out through the system, axially moving the shaft 110 and pistons 170 at these frequencies. The diaphragm 260 is secured only at the rear section of the towing head 12 and at the forward section of aft head 14 secured by an encircling hose clamp 262 with the vibratory surface of the diaphragm resting around the clamping rings 179 with some clearance and attaching to the shoulders 258 on each of the forward and aft shells 26, 16. The diaphragm 260 seals the vibratory source assembly 175 and may be filled with fresh water or fresh water mixed with propylene glycol to prevent freezing. Between the inner surface of the diaphragm 260 and the outer surface of the cylindrical housing 174 a long annular volume 265 is formed providing for water to flow through the piston chamber ports 256 and fill this space 265 around the housing 174 thereby expanding and contracting the diaphragm causing it to vibrate. An access port 264 as shown in FIG. 14 that extends through the shoulder 258 of the towing or aft section provides for the vibratory source assembly 175 to be filled with fresh water prior to deploying the system 10 within a body of water 4. A second port 266 may be used as a vent to remove air as the system 10 is filled. Preferably, the piston chamber 254 and space 265 is completely filled with water to provide vibrational-coupling over the largest surface area.

Figure 15:
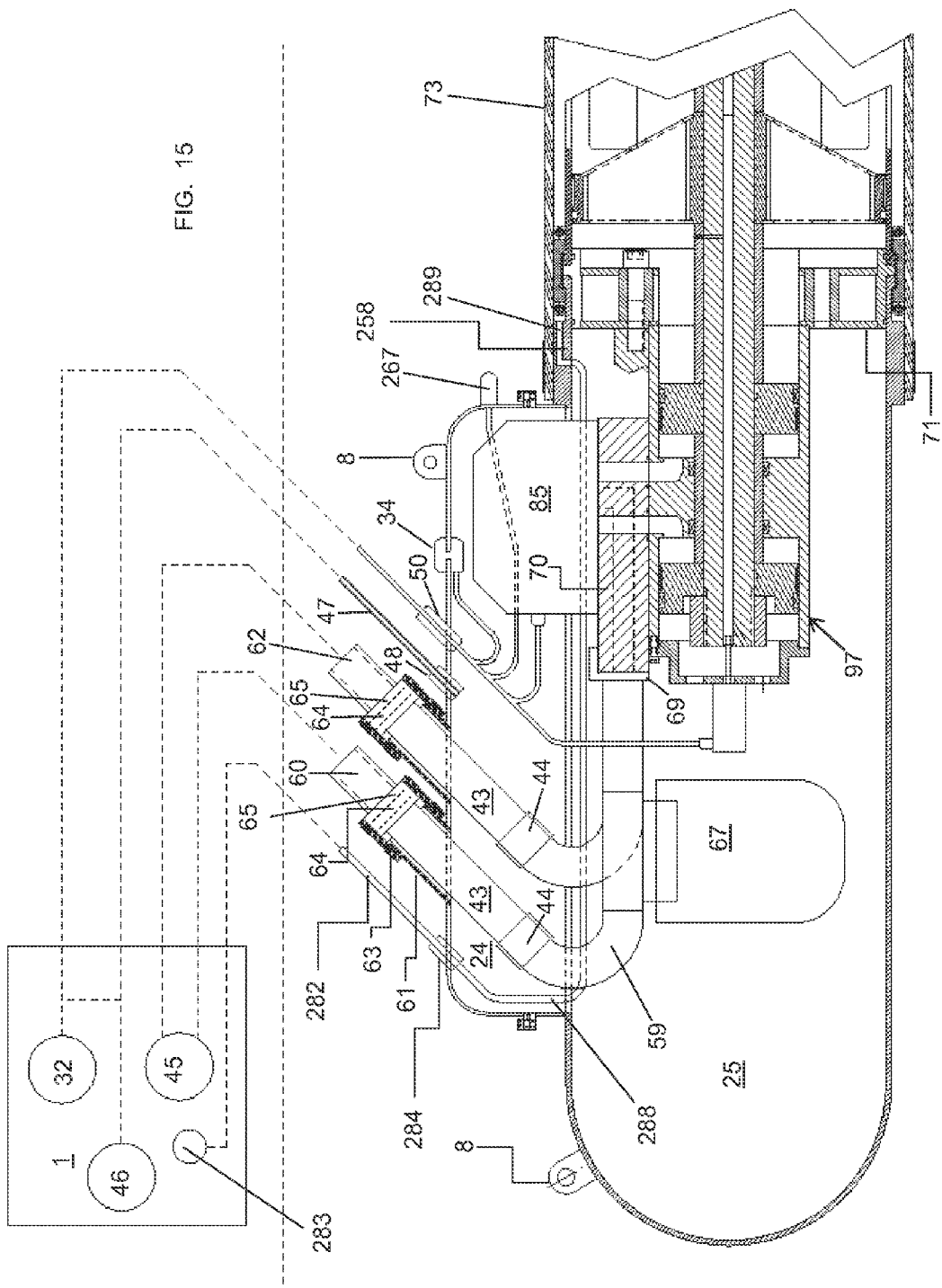
FIG. 15 is a still further embodiment of an adjustable water fill conduit for the marine vibratory source of the present invention.

In a further embodiment, shown in FIG. 15, a reservoir 283 is located on the survey vessel 1 to feed a water hose 282 that is included within the cable bundle 5 and is attached to the auxiliary hatch 24 using a detachable connector 284. An internal water feed line 288 runs from the connector 284 through the auxiliary hatch compartment 42 and the forward compartment 25 to the shoulder 258 located near the main bulkhead 120 at the rear of the towing head 12. The internal water feed line 288 attaches to a delivery bore 289 that extends through the fore section shoulder 258. In operation, the vibratory source assembly 175 is filled with fresh water prior to being submerged. The frequency response and quality of emissions are measured using the signals from a hydrophone 267 mounted to the auxiliary hatch 24 and adjustments may be made to add or subtract water to diaphragm space 265, or to vent the system of air if unwanted spikes caused by cavitation are seen within the transmitted sound signal. A large quantity of air escaping may also indicate an air leak within the system. By monitoring the system air pressure and quality of vibratory resolution, the water content may be tuned to reduce or remove cavitation at the face of the rapidly moving pistons 170 at higher frequencies.

The composite construction of the piston shaft 110 and cone-shaped pistons 170 by tightening each end nut 140 and locking each piston 170 in position using the spacer sleeves 148 removes the requirements for nuts, bolts, fittings or other attachment fixtures. The shaft 110 and pistons 170 move in complete unison providing a reproducible frequency response without protrusions or obstructions from fittings that may create water vapor or cavitation within the compression chamber 254. The diaphragm 260 expands and contracts as the pistons 170 move back and forth pumping water out of the piston chamber 254 as the cone-shaped face of the piston 239 compresses the water towards and into the cone-shaped face 227 of the stationary bulkhead 172. The opposing cone shapes 239, 227 reduce the size requirements and amount of energy required to move the piston 170 and shaft 110 as a smaller volume of water in comparison to a flat face piston is moved in and out of the chamber 254.

Figure 16:
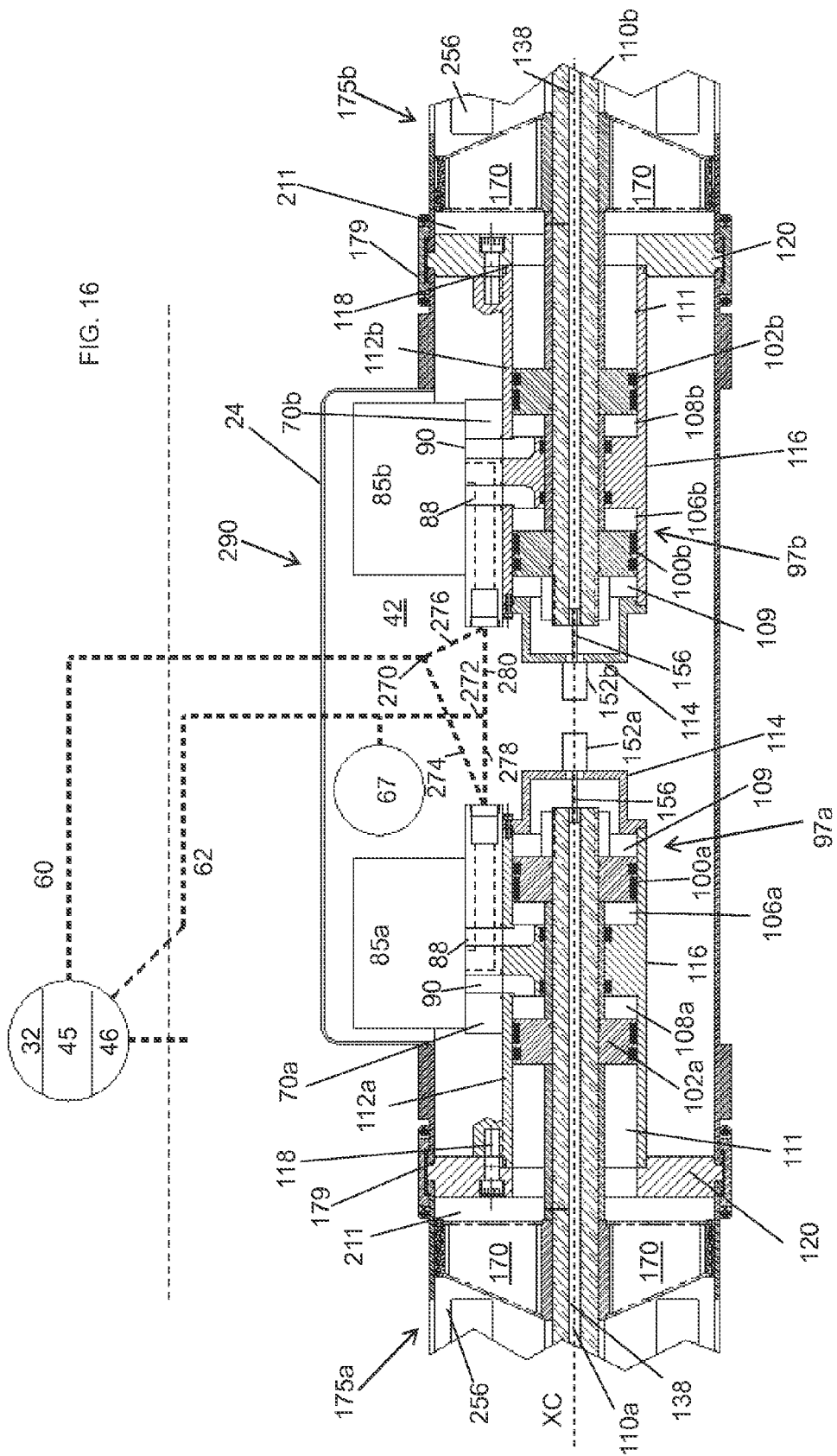
FIG. 16 is a partial side view of the further embodiment of the marine vibratory source of the present invention having a dual servo valve system.

The frequency response and reproducibility of the vibratory source may be further improved with the construction of a dual marine vibratory source 290 having a two servo valve systems and a first and second vibratory source as shown in FIG. 16. In this construction a first servo valve 85a is placed axially along the longitudinal axis XC to a second servo valve 85b. Each servo valve is positioned on a manifold 70a, 70b and on a completely separate actuator assemblies 97a, 97b that is attached to separate vibratory source assemblies 175a, 175b that extend in opposing directions. The first assembly 175a extending to the forward towing head 12 and the second assembly 175b extending to the aft section 114. The components of each system are identical as previously described with the addition of T-shaped fittings 270, 272 placed along the hydraulic input and output lines 60, 62. Within the auxiliary hatch 24 the input line 60 splits at T-shaped fitting 270 directing flow through piping 274 to the forward manifold 70a and through piping 276 to the aft manifold 70b. The hydraulic output line 62 receives flow from the forward manifold 70a through a forward output conduit 278 and from the aft manifold 70b through an aft output conduit 280.

In operation, each servo valve 85a, 85b simultaneously receives electrical signals to activate the first valve 85a to direct fluid flow to move the actuator pistons 100a, 102a in a forward direction by filling hydraulic actuator chamber 108a and evacuating hydraulic actuator chamber 106a. However, for the opposing actuator assembly 97b, the second servo valve 85b directs fluid flow to move actuator pistons 100b, 102b in an opposite aft direction by filling hydraulic actuator chamber 108b and evacuating hydraulic actuator chamber 106b. The operation of the vibratory source assemblies 175a, 175b in opposing directions corrects non-harmonic movement and spurious noise caused by the opposing movement of the cylinder housing 174 in a system 110 having only a single vibratory source assembly 175. Moving each vibratory source assembly in synchronization and in opposite directions prevents movement of the cylindrical housings and creates a dampening of noise caused by movement of the cylinder housings, thereby improving the quality of the sound produced over system 10 having a single vibratory source 175.

In this configuration, the actuator assemblies 97a and 97b extend in opposing directions and therefore the hydraulic chambers 106 and 108 are in opposite positions in the first actuator assembly 97a as compared to the second actuator assembly 97b. In moving the vibratory source assemblies 175a and 175b in and towards one another to a point of least extension, fluid is directed to the innermost hydraulic chambers 106a and 106b. To move the vibratory source assemblies 175a and 175b out and away from one another to the outermost extension, fluid is directed to the outer hydraulic chambers 108a and 108b thereby moving the first vibratory source assembly 175a to its further forward extension and moving assembly 175b to its furthest aft extension.

Figure 17:
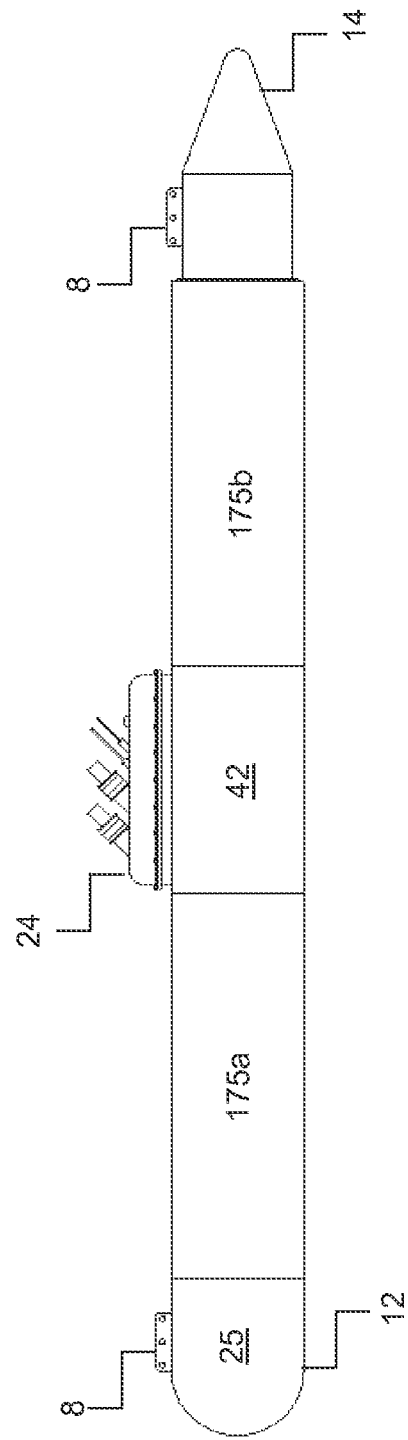
FIG. 17 is a side view of the further embodiment of the marine vibratory source of the present invention having a dual servo valve system.

The positioning sensors 152a and 152b provide feedback on the speed and location of each piston shaft 110a and 110b providing for the electronic controller 32 to adjust frequency and therefore fluid flow to the actuator assemblies 97a and 97b to synchronize the movement of each vibratory source assembly 175a and 175b thereby increasing the power amplitude. Frequency response is improved as swept or pulsed frequencies are amplified using two assemblies 175a and 175b to emit vibratory energy. As shown in FIG. 17, the auxiliary hatch 24 is positioned in the center of the marine vibratory source 290 and may be of any length or dimension, with a selection of a desired modular piston sections 177 selected to accommodate the survey and geological requirements. Marine vibratory dual servo valve systems 290 may be used in tandem or in larger numbers with each positioned within the geological survey area to increase power amplitude and cover larger areas.

In a further embodiment and in order to reduce the risk of leakage and contamination of the body of water from hydraulic fluid, the marine vibratory system may be configured with an internal closed loop hydraulic system 310. As shown schematically in FIG. 18, a sea or fresh water pump 312 is positioned on the survey vessel 1 providing a single delivery line 314. Within the towing head compartment 25, a pulse dampener 316 acts to reduce vibrations and protect system components from damage as the sea water is pumped to a water motor 324 at rates of 200 GPM for example. The water motor 324 is directly connected to an axle 334 that drives a hydraulic pump 336.

The hydraulic pump 336 is within a closed loop system with a reservoir 342 that provides hydraulic fluid to the system 310. As described above, the electronics controller 32 sends a signal to a servo valve 85 that directs hydraulic fluid through a manifold 70 to move the piston actuators 100, 102 in a forward or aft position causing a vibratory source assembly 175 to vibrate back and forth propagating sound waves out and around the marine vibratory source system 10. Hydraulic fluid is directed in and through a hydraulic input line 338 to the manifold 70 and the servo valve 85 to fill a first actuator hydraulic chamber 100 and simultaneously evacuate a second actuator hydraulic chamber 102 within the piston actuator assembly 97. In the closed loop system 310, fluid from the evacuated chamber is directed through output hydraulic lines 352 to a pulse dampener 340 to reduce system vibration caused by the movement of high pressure hydraulic fluids through the system. The fluid is then directed to a heat exchanger 350 positioned along the water outlet line 354 from the water motor 324. The heated hydraulic lines 352 are run adjacent to the cold water outlet line 354 through the heat exchanger 350 to cool the hydraulic fluid within the system 310. After cooling, the hydraulic line 358 returns hydraulic fluid to the reservoir 342 to feed the hydraulic pump 336. There are many advantages to this embodiment of a closed loop hydraulic system 310 in the reduction of contamination, lower cost and complexity as a single delivery line is needed to supply sea or fresh water to the water motor and the water is exhausted back to the body of water. Additionally, shorter lines within the hydraulic system reduce wear and tear on system components caused by higher pressures in longer hydraulic lines. The available water also provides an infinite source to drive the hydraulic pump.

In a still further embodiment, shown in FIGS. 19A and 19B, power delivery fluid to power the hydraulic pump 45 on the survey vessel is replaced with the sea or fresh water pump 312 and water is used to drive the actuator piston assembly 97. The operation of the system is the same as described with the advantage that exhaust line 354 is directed back to the body of water, so only a single delivery line 314 is needed. Some of the components of the servo valve and actuator are constructed of materials such as ceramics and plastics that are robust in operating in sea water.

The invention has been described in detail with particular reference to certain preferred embodiments thereof, but it will be understood that variations and modifications can be effected within the spirit and scope of the invention.

The invention claimed is:

1. A marine vibratory sound source, comprising:
   an elongated cylindrical housing having an axis concentric therewith;
      said elongated cylindrical housing having a plurality of cylindrical chambers;
   an axially reciprocatable hollow, cone-shaped piston and a hollow, stationary cone-shaped bulkhead within each of the cylindrical chambers;
      said stationary bulkhead attached to the elongated cylindrical housing;
   an elongated piston shaft connected to the cone-shaped pistons and extending along the axis;
   a first and second actuator piston connected to the elongated piston shaft;
   a streamlined towing head affixed to the fore end of said elongated cylindrical housing;
   a streamlined tail head affixed to the opposing end of said elongated cylindrical housing;
      said elongated cylindrical housing having a plurality of ports therein at each of said cylindrical chambers;
   a computer controllable hydraulic fluid circuit for feeding power delivery fluid alternatively to first and second hydraulic actuator pistons while simultaneously removing power delivery fluid from the other of the first and second hydraulic actuator pistons thereby moving the first and second actuator pistons to a forward position and alternatively to an aft position and thereby axially vibrating the piston shaft and cone-shaped pistons for vibrationally moving water out and in through the ports for propagating vibratory sound.

2. A marine vibratory sound source as claimed in claim 1, wherein:
   said cylindrical chambers having pressure controlled low-pressure air cavities formed between and including the interior compartments of the hollow, cone-shaped stationary bulkhead and hollow, cone-shaped piston of an adjacent cylindrical chamber to adjust pressure forces on the cone-shaped pistons.

3. A marine vibratory sound source as claimed in claim 2, wherein
   pressure control of the low-pressure air cavities is automatically adjusted to maintain a neutral force on the actuator pistons.

4. A marine vibratory sound source as claimed in claim 3, wherein:
   said first and second actuator pistons each having a hydraulic chamber;
   said first and second actuator piston hydraulic chambers having delivery bores directly communicating with a manifold and a servo valve within the computer controllable hydraulic fluid circuit;
   said delivery bores evenly spaced from a center point of an actuator housing bulkhead and of a length shorter than a diameter of one of the first and second actuator pistons; and
   said actuator pistons providing equal force in the forward and aft direction.

5. A marine vibratory sound source as claimed in claim 4, wherein:
   said servo valve receiving a control signal at a frequency of 2-200 Hz as a modulated waveform to control fluid flow within the computer controllable hydraulic fluid circuit to produce sound waves, the modulation of the waveform verified by feedback signals received from a position sensor on the piston shaft.

6. A marine vibratory sound source as claimed in claim 1, wherein:
   the power delivery fluid of the computer controllable hydraulic fluid circuit is water from the body of water wherein a single fluid delivery hose from a vessel is required as fluid is exhausted from the hydraulic fluid circuit to the body of water.

7. A marine vibratory sound source as claimed in claim 1, wherein:
   computer controllable hydraulic fluid circuit is powered by a water motor within the vibratory sound source;
   the water being from the body of water and supplied through a single fluid delivery hose from a vessel; and
   wherein water is exhausted from the water motor to the body of water.

8. A marine vibratory sound source as claimed in claim 1, further comprising:
   an auxiliary hatch having angled support tubes with flexible hose jumpers;
   said tubes with internal diameters large enough for hydraulic conduits to pass through to provide enough clearance for misalignment and vibrations during operation of the hydraulic fluid circuit.

9. A marine vibratory sound source as claimed in claim 1, further comprising a depth control fin.

10. The marine vibratory sound source as claimed in claim 1, further comprising:

an elongated circular cylindrical elastomeric diaphragm encircling said elongated cylindrical housing and being spaced radially outward from said elongated cylindrical housing;

said diaphragm being connected at its fore and aft ends to said towing head and tail head for providing an elongated annular diaphragm chamber extending longitudinally between the elastomeric diaphragm and the elongated cylindrical housing;

said diaphragm chamber being filled with water;

wherein said ports open out to the elongated annular diaphragm chamber for providing communication between water in each of said cylindrical chambers and water in the elongated annular diaphragm chamber vibrating the diaphragm.

11. The marine vibratory sound source as claimed in claim 10, further comprising:

at least one of a computer or manually controllable water feed line to add and subtract water from the volume of the annular diaphragm chamber of the cylindrical diaphragm while in operation.

12. A dual marine vibratory sound source towable behind an exploration vessel for performing marine seismic exploration, said source comprising:

first and second elongated vibratory source assemblies affixed end to end along an axis extending longitudinally therein and concentric with said vibratory source assemblies;

a plurality of piston chamber assemblies within each of said first and second vibratory source assemblies;

said piston chamber assemblies being axially spaced at positions along a piston assembly shaft and each having a hollow, cone-shaped piston and spacer sleeve said piston chamber assemblies each having a hollow, cone-shaped stationary bulkhead affixed to a cylindrical housing;

a series of ports formed within each cylindrical housing of the plurality of piston chamber assemblies;

a streamlined towing head affixed to a fore end of the first elongated vibratory source;

a streamlined tail head affixed to an aft portion of the second elongated vibratory source;

a first tandem actuator piston assembly connected to a first piston shaft and a second tandem actuator piston assembly to a second piston shaft; and a computer controllable hydraulic fluid circuit for delivering fluid alternatively to each of the first and second tandem actuator piston assemblies to move each of a first and second actuator pistons alternately fore and aft thereby axially vibrating said first and second piston shafts and each first and second vibratory sources in opposing directions for vibrating water through said ports transmitting vibratory sound into the surrounding body of water.

13. A dual marine vibratory sound source towable behind an exploration vessel for performing marine seismic exploration, as claimed in claim 12, wherein:

said first and second piston chamber assemblies having pressure controlled low-pressure air cavities formed between and including the interior compartments of the hollow, cone-shaped stationary bulkhead and hollow, cone-shaped piston of an adjacent piston chamber assembly to adjust pressure forces on the cone-shaped pistons.

14. A dual marine vibratory sound source towable behind an exploration vessel for performing marine seismic exploration, as claimed in claim 13, wherein:

pressure control of the low-pressure air cavities is automatically adjusted to maintain a neutral force on the first and second actuator pistons of each of the tandem actuator piston assemblies.

15. A dual marine vibratory sound source towable behind an exploration vessel for performing marine seismic exploration, as claimed in claim 14, wherein:

said first and second actuator pistons of each of the actuator piston assemblies each having a hydraulic chamber;

said first and second actuator piston hydraulic chambers having delivery bores directly communicating with a manifold and a servo valve within the computer controllable hydraulic fluid circuit;

said delivery bores evenly spaced from a center point of an actuator housing bulkhead and are of a length shorter than a diameter of one of the first and second actuator pistons; and said actuator pistons providing equal force in the forward and aft direction.

16. A dual marine vibratory sound source towable behind an exploration vessel for performing marine seismic exploration, as claimed in claim 15, wherein:

said first and second servo valve receiving a control signal at a frequency of 2-200 Hz as a modulated waveform to control fluid flow within each of the first and second computer controllable hydraulic fluid circuits to produce sound waves, the modulation of the waveform verified by feedback signals received from a position sensor on the piston shaft.

17. A dual marine vibratory sound source towable behind an exploration vessel for performing marine seismic exploration, as claimed in claim 12, wherein:

the power delivery fluid of the computer controllable hydraulic fluid circuit is water from the body of water and wherein a single fluid delivery hose from a vessel is required as fluid is exhausted from the hydraulic fluid circuit to the body of water.

18. A dual marine vibratory sound source towable behind an exploration vessel for performing marine seismic exploration, as claimed in claim 12, wherein:

the computer controllable hydraulic fluid circuit is powered by a water motor within the dual marine vibratory sound source;

the water being from the body of water and supplied through a single fluid delivery hose from a vessel; and wherein water is exhausted from the water motor to the body of water.

19. A dual marine vibratory sound source towable behind an exploration vessel for performing marine seismic exploration, as claimed in claim 12, further comprising a depth control fin.

20. A dual marine vibratory sound source towable behind an exploration vessel for performing marine seismic exploration, as claimed in claim 12, further comprising:

an auxiliary hatch in the center of the dual marine vibratory source;

said hatch having angled support tubes with flexible hose jumpers; said tubes with internal diameters large enough for hydraulic conduits to pass through with enough clearance for misalignment and vibrations during operation of the hydraulic fluid circuit.

21. The dual marine vibratory sound source towable behind an exploration vessel for performing marine seismic exploration, as claimed in claim 20, further comprising:

a first and second elongated circular cylindrical elastomeric diaphragm encircling each of said first and second elongated vibratory sources and being spaced radially outward from said elongated vibratory sources;

said first diaphragm being connected at its fore and aft ends to said towing head and hatch and said second diaphragm being connected at its fore and aft ends to said hatch and aft head for providing first and second elongated annular diaphragm chambers extending longitudinally between the elastomeric diaphragm and the elongated vibratory sources;

said diaphragm chambers being filled with water;

wherein said ports open out to the elongated annular diaphragm chambers for providing communication between water in each of said cylindrical chambers and water in the elongated annular diaphragm chambers vibrating the diaphragm.

22. The marine vibratory sound source as claimed in claim 21, further comprising:

at least one of a computer or manually controllable water feed line to add and subtract water from the volume of the first and second annular diaphragm chambers of the cylindrical diaphragm while in operation.

* * * * *